Dec. 26, 1967 J. V. McDONALD ETAL 3,360,093

COIN OPERATED TAPE EMBOSSING MACHINE

Filed Dec. 8, 1965

8 Sheets-Sheet 1

INVENTORS
JOHN V. McDONALD &
GERALD G. GRAHAM
BY
Prangly, Baird, Clayton, Miller & Vogel.
ATTYS.

COIN OPERATED TAPE EMBOSSING MACHINE

Filed Dec. 8, 1965 8 Sheets-Sheet 3

Dec. 26, 1967 J. V. McDONALD ETAL 3,360,093

COIN OPERATED TAPE EMBOSSING MACHINE

Filed Dec. 8, 1965 8 Sheets-Sheet 5

COIN OPERATED TAPE EMBOSSING MACHINE

Filed Dec. 8, 1965

United States Patent Office 3,360,093

Patented Dec. 26, 1967

3,360,093

COIN OPERATED TAPE EMBOSSING MACHINE

John V. McDonald, El Cerrito, and Gerald G. Graham, San Anselmo, Calif., assignors to Dymo Industries, Inc., Berkeley, Calif., a corporation of California Filed Dec. 8, 1965, Ser. No. 512,306

30 Claims. (Cl. 194—10)

ABSTRACT OF THE DISCLOSURE

There is disclosed a coin operated plastic tape embossing machine comprising an embossing mechanism, a plastic tape feed mechanism to feed the tape from a supply thereof past the embossing mechanism, mechanism for finishing an embossing operation by feeding a predetermined length of plastic tape past the embossing machanism, mechanism for cutting off the embossed portion of the plastic tape beyond the embossing mechanism, a first manually operated lever arm for operating the embossing mechanism, a second manually operated lever arm for operating the feeding mechanism, a third manually operated lever arm for operating the finishing mechanism, a fourth manually operated lever arm for operating the cut-off mechanism, a bar interconnecting the first and second lever arms for causing operation of the second lever arm for each operation of the first lever arm, lock structure having a locking condition and an operating condition and a finish condition, the lock structure in the locking condition thereof rendering the embossing, feeding and finishing mechanism inoperative and in the operating condition thereof rendering the cut-off mechanism inoperative and all of the other mechanisms operative and in the finishing condition thereof rendering the embossing and feeding and cut-off mechanisms inoperative, a coin operated control apparatus including a coin actuated switch and a lock solenoid connected in circuit and responsive to the supplying of coins thereto for placing the lock structure in the operating condition thereof, a counting apparatus including an actuating solenoid and a control switch thereto connected in circuit with the coin actuated switch and lock solenoid and responsive to a predetermined number of actuations of the embossing and feeding mechanisms for placing the lock structure in the finishing condition thereof, and apparatus responsive to the actuation of the finish mechanism for placing the lock structure in the locking condition thereof.

The present invention relates to machines for embossing plastic tape, and particularly to coin operated plastic tape embossing machines.

It is an important object of the present invention to provide a machine for embossing flexible plastic tape, which machine is coin operated and includes an embossing mechanism for embossing characters on the embossable plastic tape, feeding mechanism for feeding the tape from a supply thereof past the embossing mechanism, manually operated lever arms for operating the embossing and feeding mechanisms, a lock structure having a locking condition wherein at least one of the mechanisms is rendered in operative and an operating condition wherein both of the mechanisms are rendered operative, and a coin operated control apparatus responsive to the supplying of predetermined coins thereto for placing the lock structure in the operating condition thereof, thereby to render both the embossing mechanism and the feeding mechanism operative to emboss and to feed plastic tape upon actuation of the lever arms.

Another object of the invention is to provide a coin operated plastic tape embossing machine of the type set forth wherein the coin operated control apparatus is electrically operated and includes a solenoid for controlling the lock structure.

Yet another object of the invention is to provide a coin operated plastic tape embossing machine of the type set forth wherein the embossing mechanism and the feeding mechanism are interconnected to cause the plastic tape to be fed a predetermined distance after the embossing of a character thereon.

In connection with the foregoing object, another object of the invention is to provide a first manually operated lever arm for the embossing mechanism and a second manually operated lever arm for the feeding mechanism and a bar interconnecting the first and second lever arms for causing operation of the second lever arm for each operation of the first lever arm.

Still another object of the invention is to provide a coin operated plastic tape embossing machine of the type set forth including a cut-off mechanism for cutting an embossed section of the plastic tape from the elongated strip after the plastic tape has been fed past the embossing mechanism.

Yet another object of the invention is to provide in a coin operated plastic tape embossing machine of the type set forth counting apparatus responsive to a predetermined number of actuations of the feed mechanism for placing the lock structure in the locking condition thereof until another coin is placed in the machine.

In connection with the foregoing object, another object of the invention is to provide an electrically operated machine wherein the counting apparatus includes an actuating solenoid and a control switch therefor connected in circuit with a coin actuated switch and a lock solenoid, the control switch for the counting apparatus being actuated in response to operation of the embossing and feeding mechanisms, whereby after a predetermined number of actuations thereof to place the lock structure in the locking condition thereof.

Still another object of the invention is to provide in a coin operated plastic tape embossing machine of the type set forth mechanism for finishing the embossing operation by feeding a predetermined length of the plastic tape past the embossing mechanism, thereby to provide a suitable margin on each end of the embossed length of plastic tape.

In connection with the foregoing object, another object of the invention is to incorporate a cut-off mechanism in the machine, the lock structure forming a part of the machine having a locking condition and a finish condition and an operating condition, the lock structure in the locking condition thereof rendering the embossing and feeding and finishing mechanisms inoperative and in the finish condition thereof rendering the embossing and feeding and cut-off mechanisms inoperative and in the operating condition thereof rendering the cut-off mechanism inoperative and all of the other mechanisms operative.

Yet another object of the invention is to provide in a coin operated plastic tape embossing machine a signal light that provides a first signal when the lock structure is in the locking condition and that provides a second signal when the lock structure is in an operating condition so that a user will know when the embossing and feeding mechanisms can be operated.

In connection with the foregoing object, another object of the invention is to provide first and second signal lights in the machine, the first signal light being energized when the lock structure is in the operating condition thereof, thereby indicating that the embossing and feeding mechanisms can be operated, and the second signal light being energized when the lock structure is in the finish condition thereof, thereby indicating that the finish mechanism can be actuated, and neither of th signal lights being energized when the lock structure is in the locking condition thereof, thereby indicating that the embossing operation is terminated A further object of the invention is to provide in a coin operated plastic tape embossing machine of the type set forth a coin rejecting apparatus which is responsive to the placement of the lock structure in the operative condition thereof for rejecting coins from the machine until the lock structure is returned to the locking condition, thereby requiring the insertion of an additional coin for additional use of the embossing mechanism.

Further features of the invention pertain to the particular arrangement of the parts and the interconnecion and operation thereof whereby the above-outlined and additional operating features thereof are attained.

The invention, both as to its organization and method of operation, together with further objects and advantages thereof, will best be understood by reference to the following specification taken in connection with the accompanying drawings, in which.

Figures 1, 2:
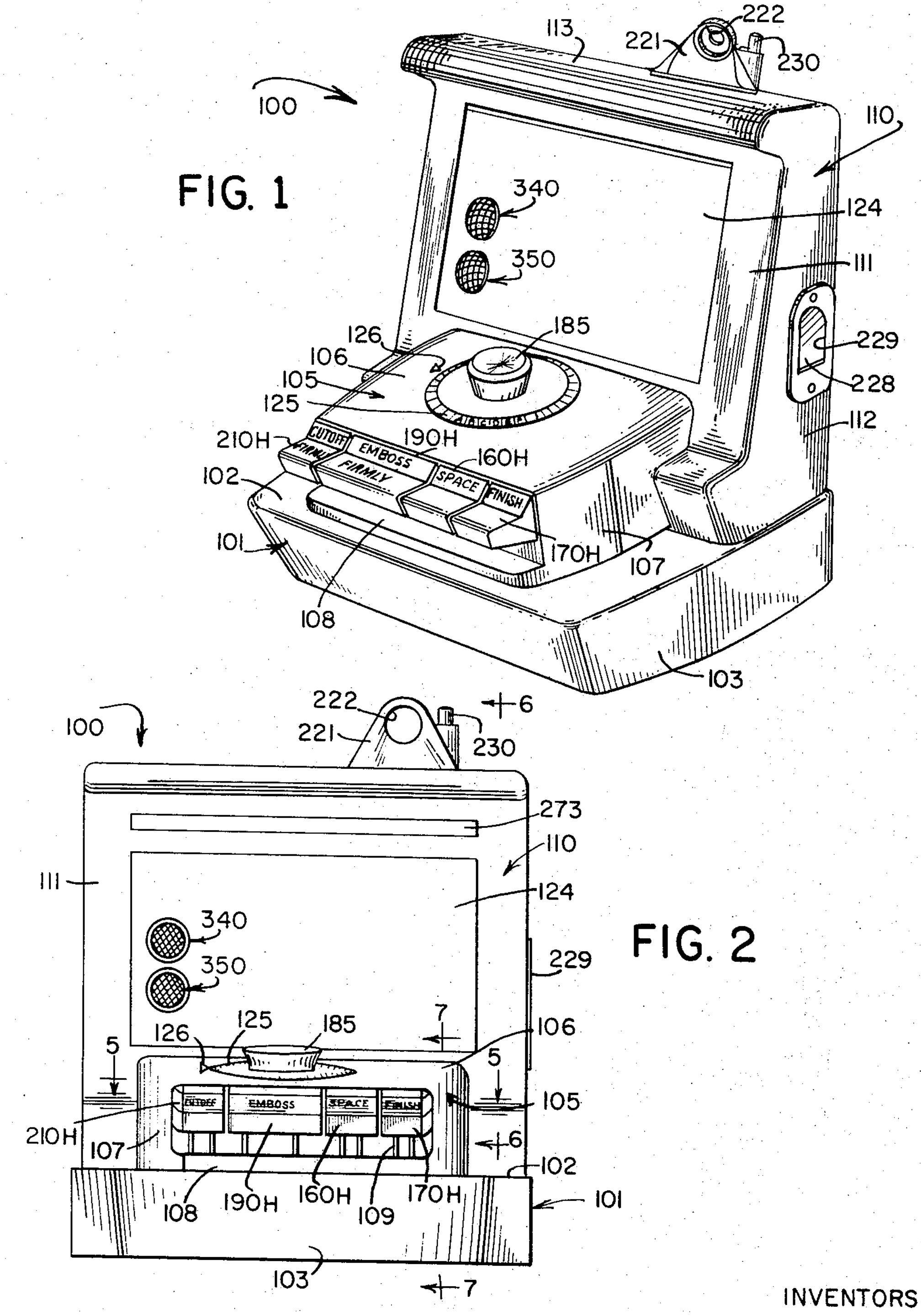
FIGURE 1 is a front perspective view of a coin operated embossing machine made in accordance with and incorporating the principles of the present invention therein.
FIG. 2 is a front elevational view of the machine of FIG. 1.
Figure 3:
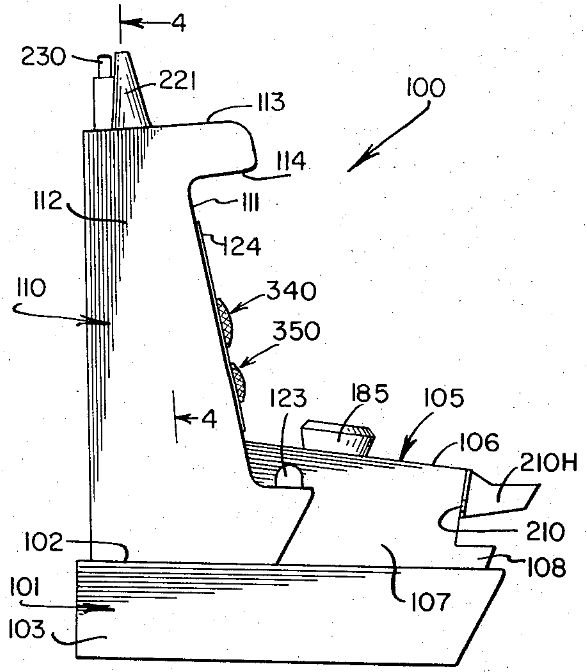
FIG. 3 is a side elevational view of the machine of FIGS. 1 and 2.

Referring to the drawings, there is illustrated a coin operated tape embossing machine 100 made in accordance with and embodying the principles of the present invention, the parts of the machine being mounted on and housed within a lower housing 101, a central housing 105 mounted thereon and an upper housing 110 also mounted thereon. Referring specifically to FIGS. 1 to 3 of the drawings, it will be seen that the lower housing 101 includes a generally horizontally disposed top wall 102 and a depending side wall 103 extending therearound and a bottom wall 104 (see FIG. 7), there being an opening generally centrally of the top wall 102 and extending downwardly to the bottom wall 104 and closed by the central housing 105. The central housing in turn includes a top wall 106 that is generally rectangular in shape from which depends downwardly a side wall 107 extending therearound and having on the forward portion thereof an outwardly extending front flange 108 and a plurality of vertically extending slots 109 to receive therethrough lever arms as will be described more fully hereinafter. Disposed to the rear of the central housing 105 and supported by the lower housing 101 is an upstanding upper housing 110, the upper housing 110 including a front wall 111, a pair of side walls 112, a top wall 113 and a rearwardly directed lower wall 114. Preferably all of the housings 101, 105 and 110 are formed of a suitable material such as cast metal, the preferred material being cast aluminum, and the three housings are suitably secured one to the other to form an essentially unitary housing structure. More specifically, a pair of brackets 115 is provided at the rear of the lower housing 101 (see FIG. 7) that engage projections 116 on the upper housing 110 to provide interconnection therebetween and there further are provided straps 117 extending between the central housing 105 and the upper housing 110 and suitably secured thereto as by screws 118.

Disposed within the resultant housing structure provided by the various housings 101, 105 and 110 are the operating portions of the machine 100 including the feed mechanism, the embossing mechanism, the finish mechanism, the cut-off mechanism and the coin actuated control circuitry therefor. Referring particularly to FIGS. 5, 7, 8, 10, 11 and 16 of the drawings, the details of the construction and operation of the feed mechanism 130 will be described. Mounted in the lower housing 101 and supported on the bottom wall 104 thereof is an upstanding post 132 about which is disposed a substantially flat roller bearing support member **132*a* upon which is disposed a support plate 133 for rotation thereabout and thereupon. Mounted on the support plate 133 is a roll 131*a* of tape 131, the tape 131 being an embossable plastic tape such, for example, as that disclosed in United States Letters Patent Nos. 2,925,625, 2,996,822, 3,036,945 and 3,047,443; such tapes are of a character such that when stressed or embossed the color or light transmitting properties thereof in the stretched or embossed areas is change so that a character is formed to contrast with the general overall background color of the tape. The tape 131 is fed upwardly from the roll 131*a* thereof supported on the plate 133 and across a first guide 134 and a second guide 135, both of which are supported by frames 142 that are in turn mounted upon and supported by a mounting plate 140, the mounting plate 140 being supported on the lower housing 101 by a pair of brackets 143 that are secured at the opposite ends thereof to the lower housing 101 and the mounting plate 140 by screws 144. From the second guide 135, the tape 131 is fed upwardly between a pair of support brackets 136 and around a feed roller 145 and particularly around a tape engaging portion 146 thereon (see FIG. 11), the feed roller 145 being supported in another frame 141 also mounted upon the mounting plate 140 and within the central housing 105. Preferably the feed roller 145 is formed of a synthetic organic plastic resin and the tape engaging portion 146 may be formed of rubber or some other good gripping material to engage the adjacent surface of the tape 131 to provide a good driving contact therewith. In addition, a spring finger 137 is provided bearing against the upper surface of the tape 131 at the point that it contacts the tape engaging portion 146 to insure good engagement therewith, the spring finger 137 being mounted on the housing 141 by means of a screw 138, see FIG. 8. One end of the feed roller 145 carries an integral detent portion 147 having a plurality of outwardly extending detent fingers 148 thereon that are uniformly spaced apart for receiving therebetween the end of a detent arm 149 also mounted upon the frame 141 by means of the screw 138. The detent fingers 148 and the associated detent arm 149 cooperate to provide for stepwise positioning of the feed roller 145 during the operation thereof. Formed adjacent to the detent portion 147 on the feed roller 145 is a first ratchet portion 150 having a plurality of equally spaced apart ratchet teeth 159 mounted thereon for cooperation with a pawl to be described more fully hereinafter. The other end of the feed roller 145 carries a second ratchet portion 155 having equally spaced apart teeth 156 thereon (see FIG. 10), also for driving the feed roller 140** as will be described more fully hereinafter.

Figure 5:
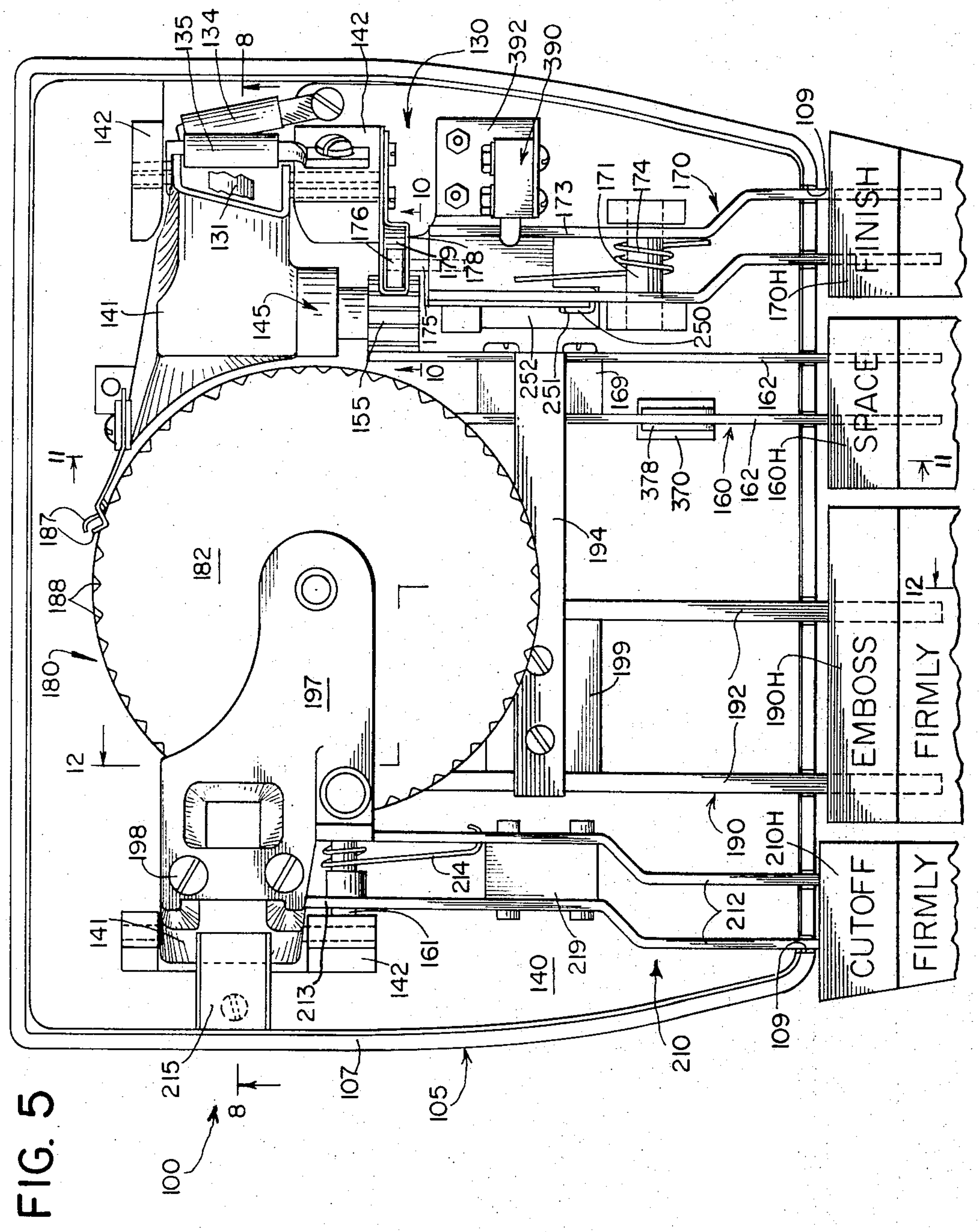
FIG. 5 is an enlarged view in horizontal section with certain portions broken away through the machine of FIG. 2 along the line 5—5 thereof.
Figure 8:
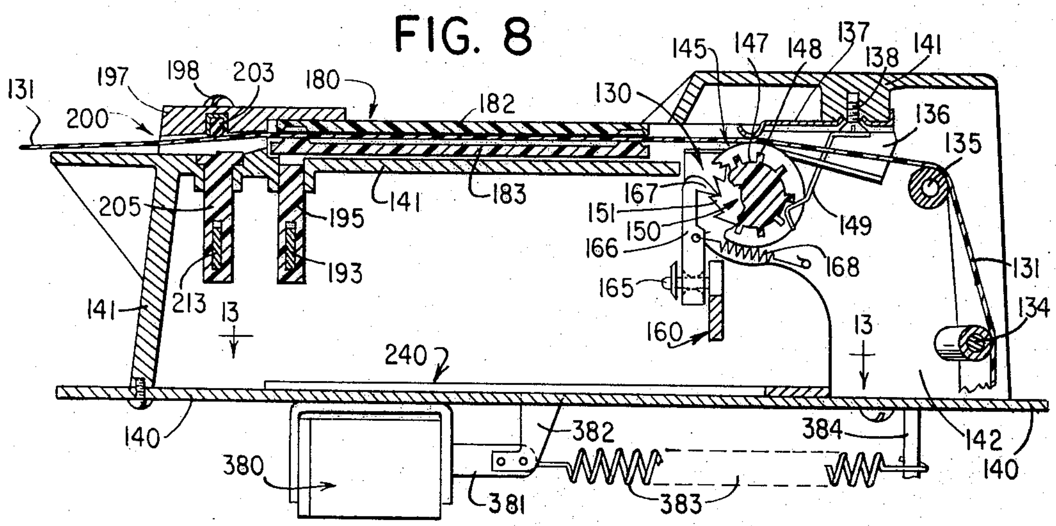
FIG. 8 is a view in vertical section along the line 8—8 in FIG. 5.
Figure 11:
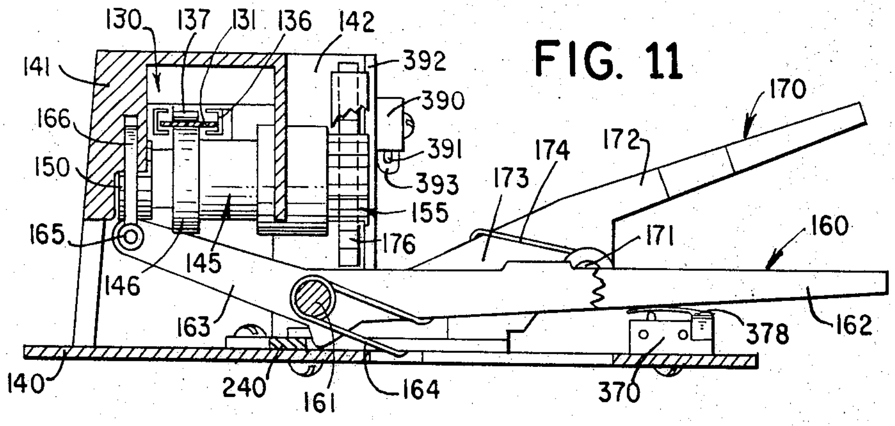
FIG. 11 is a view in vertical section along the line 11—11 of FIG. 5.

The feed mechanism 130 is driven by two levers, namely, a space lever 160 and a finish lever 170. Referring particularly to FIGS. 5, 8 and 11 of the drawings, it will be seen that the space lever 160 includes a handle 160H on the outer end thereof adapted to be engaged by the hand of a user and in fact includes two substantially parallel plates 162 that extend through the slots 109 in the housing side wall 107 and are connected together as at 169 so that the plates 162 and the connectors 169 cooperate to provide the space lever 160. The space lever 160 is mounted for pivotal movement about a pivot rod 161, the rod 161 being also mounted in the frames 142. An outer arm 163 on the space lever 160 extends forwardly or to the left as viewed in FIG. 11 from the pivot rod 161 and carries on the outer end thereof a shaft 165 having the axis thereof disposed normal thereto and carrying thereon an upwardly directed pawl 166, the pawl 166 having a nose 167 engageable with one of the ratchet teeth 151 on the first ratchet portion 150 on the feed roller 145. The connection between the pawl 166 and the mounting shaft 165 therefor is loose, and a spring 168 under tension is connected between the pawl 166 and the adjacent frame 142 so that the pawl 166 is continually urged to a position such that the nose 167 thereof engages the ratchet teeth 151. Finally, there is provided a spring 164 connected between the mounting plate 140 and the lever arm 60, the spring 164 being under compression and continually urging the space lever 160 in the counterclockwise direction as viewed in FIG. 11, i.e., a direction to pull the pawl 166 downwardly. In order to feed a predetermined unit length of the tape 131 using the feed mechanism 130, the user need only depress the lever handle 160H, thereby to pivot the space lever 160 in the clockwise direction as viewed in FIG. 11, thereby to lift the pawl 166 upwardly until the nose 167 thereof engages the next higher or clockwise positioned ratchet tooth 151 as viewed in FIG. 8. When the user releases the space lever 160, the spring 164 will pivot the space lever 160 in a counterclockwise position as viewed in FIG. 11, thereby to pull the pawl 166 downwardly and to cause rotation of the feed roller 145 in a counterclockwise direction as viewed in FIG. 8; the distance that the feed roller 145 is rotated is at least in part controlled by the detent arm 149 and the detent fingers 148, one operation of the space lever 160 serving to move the parts sufficiently to permit the detent arm 149 to move from one space to the next adjacent space disposed clockwise with respect thereto. In this manner, a predetermined stepwise movement of the tape 131 is effected by the feed mechanism 130 each time that the user depresses the space lever 160 by engaging the handle 160H and pressing downwardly.

Operation of the feed mechanism 130 is also accomplished by means of operation of the finish mechanism including the finish lever 170, see FIGS. 5, 7, 10 and 11 particularly. The finish lever 170 is also provided with an external handle 170H adapted to be grasped by the user and includes a pair of plates 172 that extend outwardly through the slots 109 in the housing side wall 107, the finish lever 170 being mounted for pivoting about a pivot rod 171 mounted upon the mounting plate 140; the forward or outer ends of the plates 172 are interconnected to provide an outer arm 173 that carries a forwardly extending finger 175. A spring 174 under compression is connected between the finish lever 170 and the mounting plate 140 whereby continually to urge the finish lever 170 in a counterclockwise direction as viewed in FIG. 11, thereby to raise the handle 170H and to lower the finger 175 with respect to the mounting plate 140. The finish lever 170 controls the operation of the second ratchet portion 155 on the feed roller 145 and more particularly engages a pawl 176 that is mounted in a guide 178 supported by one of the frames 142, see particularly FIG. 5, the guide 178 containing the pawl 176 therein for vertical reciprocation, the pawl 176 having an elongated opening 176a at the lower end thereof that receives therethrough the finger 175 on the outer end of the finish lever 170. One side of the pawl 176 is provided with a plurality of teeth 177 thereon, see FIG. 10, the teeth 177 being adapted to engage the ratchet teeth 156 and being urged thereagainst by a spring 179 disposed between the ratchet 176 and the housing 178. As a consequence of this construction, when the user presses the handle 170H downwardly, thereby to pivot the finish lever 170 in a clockwise direction as viewed in FIG. 11, the pawl 176 is moved upwardly, and due to the engagement between the teeth 156 and 177, the feed roller 145 is driven in a feeding direction a predetermined distance, preferably the number of teeth and the spacing thereof being such that one full actuation of the finish lever 170 feeds five times as much of the tape 131 as does a single actuation of the space lever 160.

Also mounted on the frame 161 is an embossing mechanism 180, the details of construction of which will now be described with special reference to FIGS. 5, 7, to 9 and 12. Mounted upon the frame 140 is a generally vertically extending post 181 (see FIG. 7) which is mounted for rotation with respect thereto, the lower end of the post 181 carrying an upper female die member 182 and a lower male die member 183, the general shape of the die members 182 and 183 being circular as is best seen in FIG. 5 of the drawings. The die members 182 and 183 are preferably formed of a synthetic organic resin, the preferred resin being an acetal resin sold under the trademark "Delrin," the resin being sufficiently hard to produce clear sharp embossments on the tape 131 which is preferably formed of a polyvinyl chloride resin. The upper female die member 182 has a plurality of characters such as numbers, letters and the like formed about the periphery thereof as cavities in the lower surface thereof, while the male die member 183 has corresponding characters in the form of projections on the upper surface thereof, each of the projections on the die member 183 being provided on a tongue 184 which is formed by radially slotting the die member 183. In this manner, upward pressure on a selected one of the tongues 184 will cause it to be deformed and urge it into a nested relation with the female die cavity carried in the under surface of the die member 182, thereby to emboss the tape 131 disposed therebetween.

The die set formed by the die members 182 and 183 is actuated by an emboss lever 190 that carries on the outer end thereof a handle 190H, the emboss lever 190 in fact including a pair of plates 192 that are connected as at 199 to provide the emboss lever 190, the plates 192 extending outwardly through the slots 109 in the side wall 107 of the housing 105, whereby the user has access to the handle 190H carried thereby. The emboss lever 190 is also pivoted about the rod 161, a spring 191 (see FIG. 12) being provided continually to urge the handle 190H upwardly to the raised position thereof. The forward end of the emboss lever 190 carries a curved outer arm 193 which extends through an opening in a punch 195 that is mounted for reciprocating movement in the housing 141, the punch 195 having elongated slot 196 therein that receives the outer end of the arm 193 therethrough. When a user presses downwardly upon the handle 190H, the emboss lever 190 is rotated so as to lift the outer arm 193 and thus to move the punch 195 upwardly and against the underside of the tongue 184 disposed immediately thereabove and carrying thereon an embossment to force the embossment upwardly into the female cavity in the die member 182 disposed immediately thereabove, see FIGS. 8 and 9. A plate 197 is mounted upon the frame 141 by means of a screw 198 to provide a backing for the die member 182 to insure that a firm embossment is made by the die members 182 and 183 upon the length of the tape 131 disposed therebetween.

In order to select a character to be embossed upon the tape 131 by the embossing mechanism 180, there is provided on top of the machine 100 a knob 185 that is secured to the upper end of the post 181, the post 181 extending upwardly through an opening 121 in an annular depressed wall 120 on the top wall 106 of the housing 105. A shield 122 circular in shape is disposed upon the upper surface of the annular wall 122 and has an opening in the center thereof to receive the upper end of the post 181 therethrough, the post 181 having a shoulder 186 thereon upon which rests an indicator plate 125 that is secured thereto for rotation therewith. The indicator plate 125 carries on the periphery thereof a set of characters like those provided on the die members 182 and 183 and cooperates with an index 126 on the housing 105, whereby when the character on the indicator plate 125 is opposite the index 126, the same character on the die members 182 and 183 is disposed above the punch 195 in the embossing mechanism 188, whereby the user can manually select the character to be embossed by the manipulation of the knob 185. A pair of detent arms 187 mounted on the housing 141 engage notches 188 in the periphery of the die members 182 and 183 positively to position the same.

There further is provided upon the emboss lever 190 a bar 194 firmly secured thereto and extending laterally and outwardly therefrom to overlie the space lever 160, whereby upon each actuation of the emboss lever 190, the space lever 160 is also actuated. As a consequence, after the embossing of a character on the tape 131 by means of the embossing mechanism 190, the tape 131 is thereafter fed a predetermined distance or space by the action of the space lever 160. However, the space lever 160 can be actuated without actuating the emboss lever 190.

After the tape 131 leaves the embossing mechanism 180, it passes to a cut-off mechanism 200, the construction and operation of which will be described in detail with special reference to FIGS. 5, 8, 9 and 16 of the drawings. Mounted in a recess in the plate 197 adjacent to the embossing mechanism 180 is a stationary cutting blade 201 and a stationary slitting blade 202 spaced forwardly of the blade 201, a resilient member 203 being disposed therebetween, the cutting edges of the blades 201 and 202 being disposed in essentially the same horizontal plane and with the cutting edges disposed transversely of the path of travel of the tape 131. An anvil 205 is mounted for vertical reciprocating movement in the frame 141 immediately below the blades 201 and 202, the upper end of the anvil 205 carrying a first working surface 206 at a relatively higher elevation for engagement with the cutting blade 201 and a second working surface 207 at a relatively lower elevation for cooperation with the slitting blade 202. Preferably the anvil 205 is constructed of a synthetic organic plastic resin, the preferred material being an acetal resin sold under the trademark "Delrin."

Figure 9:
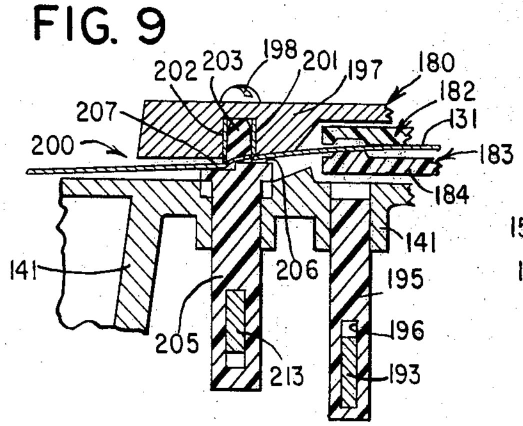
FIG. 9 is a further enlarged fragmentary view of the lefthand portion of FIG. 8 and illustrating further the embossing and cut-off mechanisms.
Figure 10:
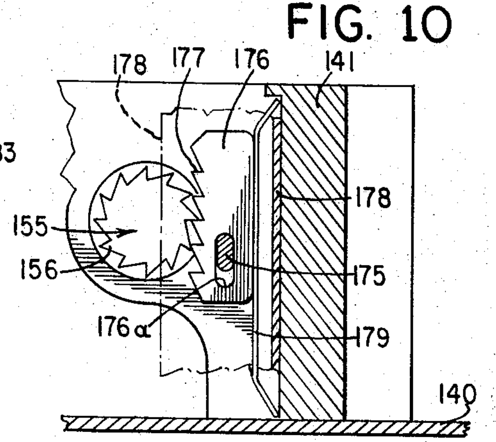
FIG. 10 is a further enlarged view of a portion of the machine of FIG. 5 as seen along the line 10—10 thereof.

In order to actuate the anvil 205, a cut-off lever 210 has been provided having a handle 210H disposed for ready engagement by a user. The lever 210 in fact includes a pair of plates 212 that are interconnected as at 219 to provide the cut-off lever 210, the lever 210 being mounted for pivotal movement about the rod 261. The forward end of the cut-off lever 210 carries an outer arm 213 that extends into an elongated slot 208 formed in the lower end of the anvil 205, whereby the cut-off lever 210 is operative to drive the anvil 205 in a vertical direction, a spring 214 being provided between the cut-off lever 210 and the mounting plate 140 to urge the cut-off lever 210 to the rest position thereof, i.e., with the handle 210H elevated and the outer arm 213 lowered in the position illustrated in FIG. 8. When a user wishes to cut off a section of the tape 131, he simply depresses the handle 210H which pivots the outer arm 213 upwardly to drive the anvil 205 to the position illustrated in FIG. 9. Such movement causes the working surface 206 to move upwardly and contact the lower edge of the blade 201, thereby completely to sever the tape 131 at this point, the working surface 207 moving up to be disposed a predetermined distance away from the cutting edge of the slitting blade 202, whereby to cut through only a predetermined portion of the thickness of the tape 131. That portion of the tape 131 disposed to the left of the blade 201 in FIG. 9 is the embossed portion which is to be delivered to the user of the machine 100. It is pointed out that as the tape 131 passes the cut-off mechanism 200, it passes along a chute 215, see FIG. 5, and then outwardly through a delivery opening 123 and the side wall 107 of the housing 105 (see FIG. 3) where the embossed tape 131 can be grasped by the user. Further details of the construction of the feed mechanism 130 the embossing mechanism 180 and the cut-off mechanism 200 can be found by reference to the co-pending application for United States Letters Patent Ser. No. 345,923 filed Sept. 19, 1964 by Dane H. Pederson for Hand Operated Embossing Tool.

In accordance with the present invention, use of the various levers 160, 170, 190 and 210 is controlled by a coin actuated control apparatus, whereby a user may emboss a length of the tape 131 only after depositing a suitable coin or coins in the machine 100. To this end the machine 100 has been provided with the usual coin handling mechanism 220 which includes a coin inlet 221 mounted on the top wall 113 having an opening 222 therein that communicates with a chute 223 that feeds to a coin rejector mechanism 224 of standard construction which is operative to reject coins of improper denomination, inferior quality, counterfeit character, bent and the like. Those coins which pass the rejector mechanism 224 pass downwardly into a delivery chute 225 which empties into a coin receptacle 226 in the lower housing 101, and those coins which are rejected by the rejector mechanism 224 are fed to a coin return chute 227 that communicates with a receptacle 228 that is open to the user through an aperture 229 in the righthand side wall 112 of the upper housing 110. There also is provided near the coin inlet 221 a coin release plunger 230 which acting through a link 231 is operative to release a coin that is trapped in the rejector mechanism 224, all in the usual manner.

Figures 12, 13, 14, 15:
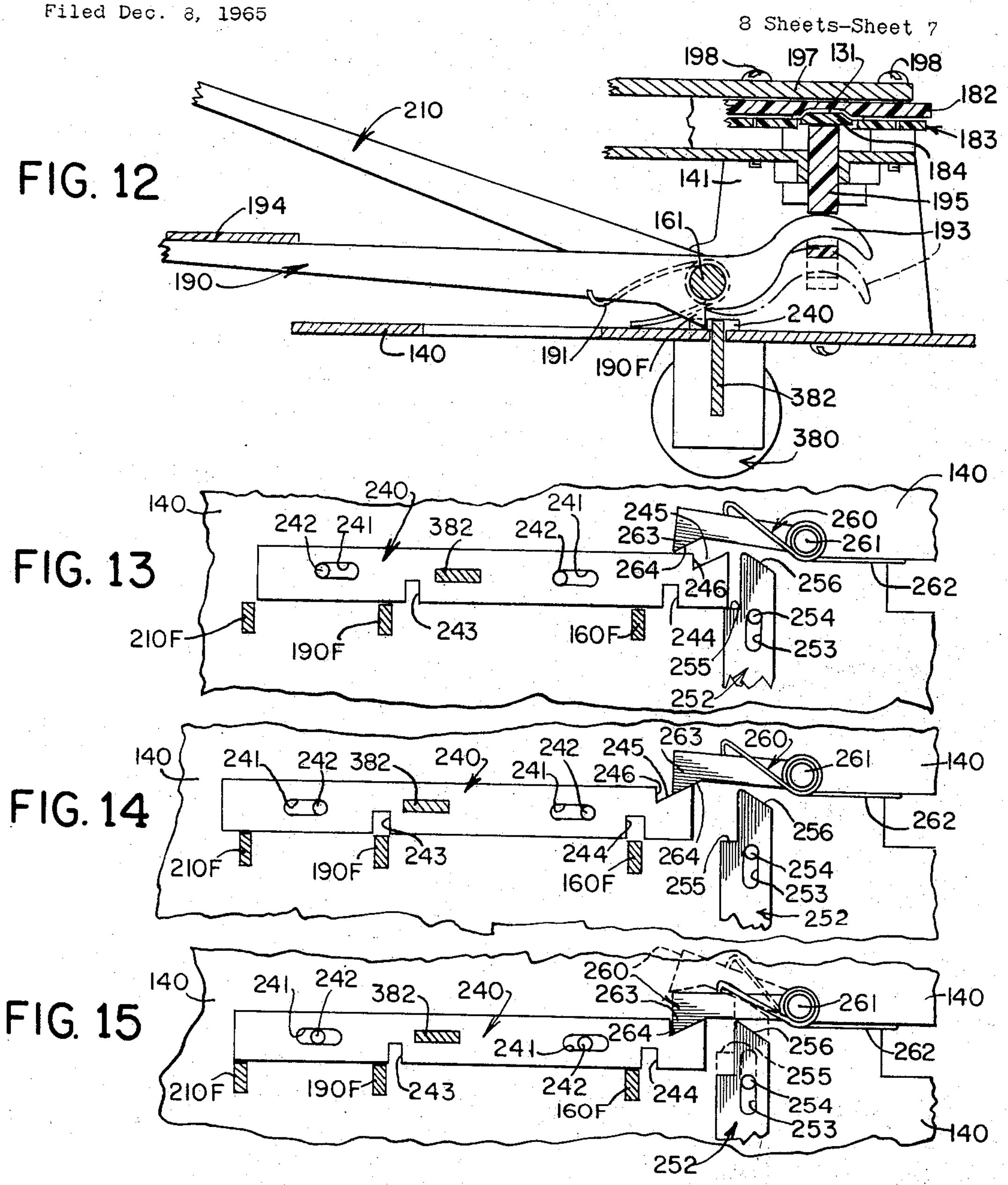
FIG. 12 is a view in vertical section along the line 12—12 of FIG. 5.
FIG. 13 is a fragmentary view in horizontal section along the line 13—13 of FIG. 8.
FIGS. 14 and 15 are views similar to FIG. 13 and illustrating various positions of the parts therein.

The coin handling mechanism 220 through the operation of the control circuit to be described hereinafter controls the operation and positioning of a lock bar 240 which serves to determine whether the user can actuate any one of the levers 160, 170, 190 or 210. Referring particularly to FIGS. 8 to 16 of the drawings, it will be seen that the lock bar 240 is essentially rectangular in shape and is mounted for transverse sliding movement upon the mounting plate 140 and, as is most particularly seen in FIG. 11, is disposed below and slightly forwardly or to the left with respect to the pivot rod 161. In order to insure that the lock bar 240 moves in the desired linear path, a pair of elongated and longitudinally extending slots 241 is formed therein and each receives upwardly thereinto a pin 242 mounted upon the support plate 140. Formed in the rear or lower portion of the locking bar 240 as viewed in FIGS. 13 to 15 are control notches 243 and 244 respectively, the notches 243 and 244 being generally rectangular in shape; and formed in the forward or upper edge of the lock bar 240 is a triangular notch 245 having an abutment surface 246 defined thereby. The notches 243 and 244 are adapted to cooperate with locking fingers 190F and 160F formed integral on the lower portions of the emboss lever 190 and the space lever 160, respectively, the notches 243 and 244 moving into and out of alignment with the associated lock fingers as required. The cut-off lever 210 likewise has a lock finger 210F which moves into and out of engagement with the lock bar 240 depending upon the position thereof. Finally, the finish lever 170 has a depending arm 250 that extends downwardly and engages in an elongated slot 251 in a slide or lock pawl actuator 252, the slide 252 having a second elongated slot 253 therein receiving an upstanding pin 254 mounted upon the mounting plate 140 to guide the reciprocating movement of the slide 252 as the finish lever 170 is operated. The forward or upper portion of the slide 252 as viewed in FIGS. 13 to 15 has an abutment shoulder 255 thereon adapted to engage the associated end of the lock bar 240 and having a nose 256 at the outermost end thereof. Mounted adjacent to the righthand end of the lock bar 240 and directly in front of the slide 252 is a lock pawl 260, the righthand end of the lock pawl 260 being pivoted about a pin 261 mounted upon the support plate 140, a spring 262 being provided for continually urging the lock pawl 260 in a counterclockwise direction as viewed in FIGS. 13 to 15. The other end of the lock pawl 260 is provided with a triangular nose 263 that is shaped complementary to the triangular notch 245 in the lock bar 240 and including an abutment surface 264 at the outer or lefthand end thereof.

Referring to FIG. 13 of the drawings, the lock bar 240 is there illustrated in the locking position thereof and it will be seen that the space lever 160, the finish lever 170 (because of its connection to the slide 252) and the emboss lever 190 are blocked or prevented from operation by the lock bar 240, whereas the cut-off lever 210 is free to operate; more specifically, the lock finger 160F on the space lever 160 abuts against the rear edge of the lock bar 240 thus preventing operation of the space lever 160 and the associated feed mechanism 130, the shoulder 255 on the slide 252 abuts the rear edge of the lock bar 240 thus preventing operation of the finish lever 170 and the associated feed mechanism 130, the lock finger 190F on the emboss lever 190 abuts the rear surface of the lock bar 240 thus preventing operation of the emboss lever 190 and the associated embossing mechanism 180, while the lock finger 210F on the cut-off lever 210 is out of engagement with the lock bar 240 thereby to permit actuation of the cut-off lever 210 to operate the cut-off mechanism 200; as a consequence, when the lock bar 240 is in the locking position illustrated in FIG. 13, only the cut-off mechanism 200 can be operated.

Referring to FIG. 14, the lock bar 240 is there illustrated in the operating position thereof, and it will be seen that the space lever 160, the finish lever 170 (because of its connection to the slide 252) and the emboss lever 190 are free to operate, whereas the cut-off lever 210 is blocked; more specifically, the lock finger 160F on the space lever 160 is in alignment with the notch 244, thus allowing operation of the space lever 160 and the associated feed mechanism 130; the shoulder 255 on the slide 252 is out of engagement with the lock bar 240 thus permitting operation of the finish lever 170 and the associated feed mechanism 130; the lock finger 190F on the emboss lever 190 is in alignment with the notch 243 of the lock bar 240 thus permitting operation of the lever 190 and the associated embossing mechanism 180; while the lock finger 210F on the cut-off lever 210 is in engagement with the rear edge of the lock bar 240 thus preventing actuation of the cut-off lever 210 and thus preventing operation of the cut-off mechanism 200.

Referring to FIG. 15 of the drawings the lock bar 240 is there illustrated in the finish position thereof and it will be seen that the space lever 160, the emboss lever 190 and the cut-off lever 210 are blocked or prevented from operation by the lock bar 240, whereas the finish lever 170 is free to operate; more specifically, the lock finger 160F on the space lever 160 abuts against the rear edge of the lock bar 240, thus preventing operation of the space lever 160 and the associated feed mechanism 130; the lock finger 190F on the emboss lever 190 abuts the rear surface of the lock bar 240 thus preventing operation of the emboss lever 190 and the associated embossing mechanism 180; the lock finger 210F on the cut-off lever 210 abuts against the rear surface of the lock bar 240 thus preventing actuation of the cut-off lever 210 and the associated cut-off mechanism 200; while the shoulder 255 on the slide 252 is out of engagement with the lock bar 240 thus permitting operation of the finish lever 170 and the associated feed mechanism 130. Further, the lock pawl 260 is operated by the slide 252, the lock pawl 260 being useful to establish the finish position of the lock bar 240 as illustrated in FIG. 15, all as will be explained more fully hereinafter.

Figure 4:
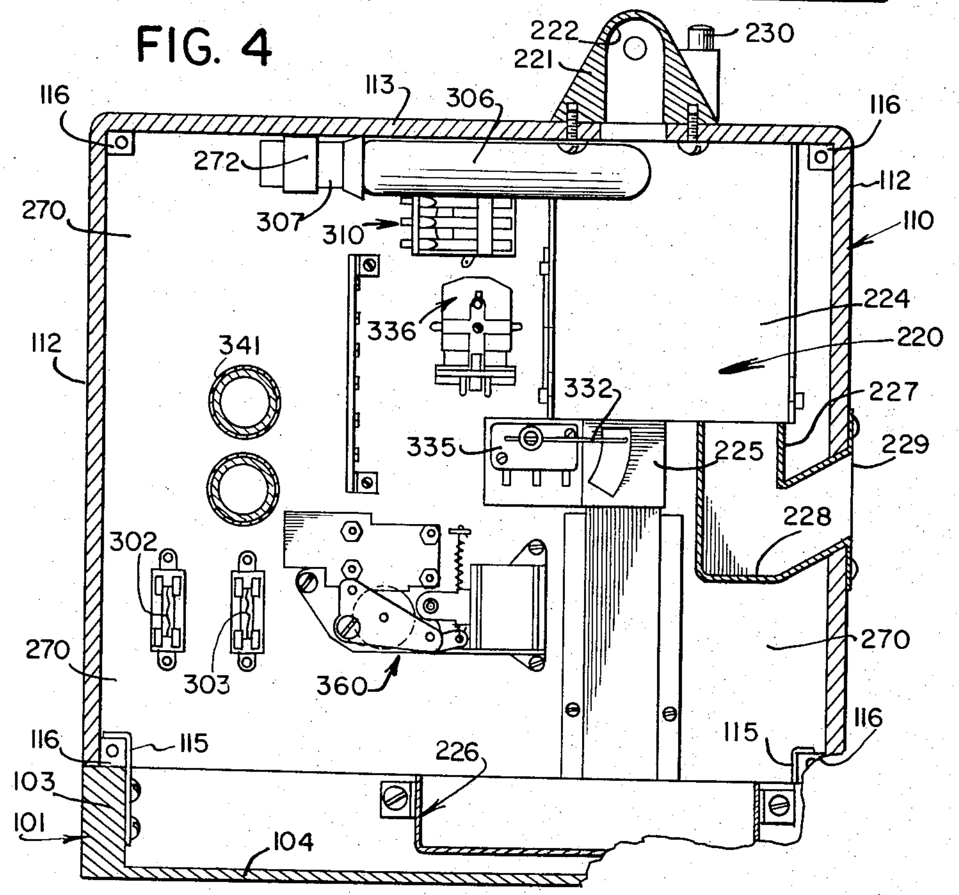
FIG. 4 is a partial enlarged view in vertical section with certain portions broken away through the machine of FIG. 3 along the line 4—4 thereof.
Figure 6:
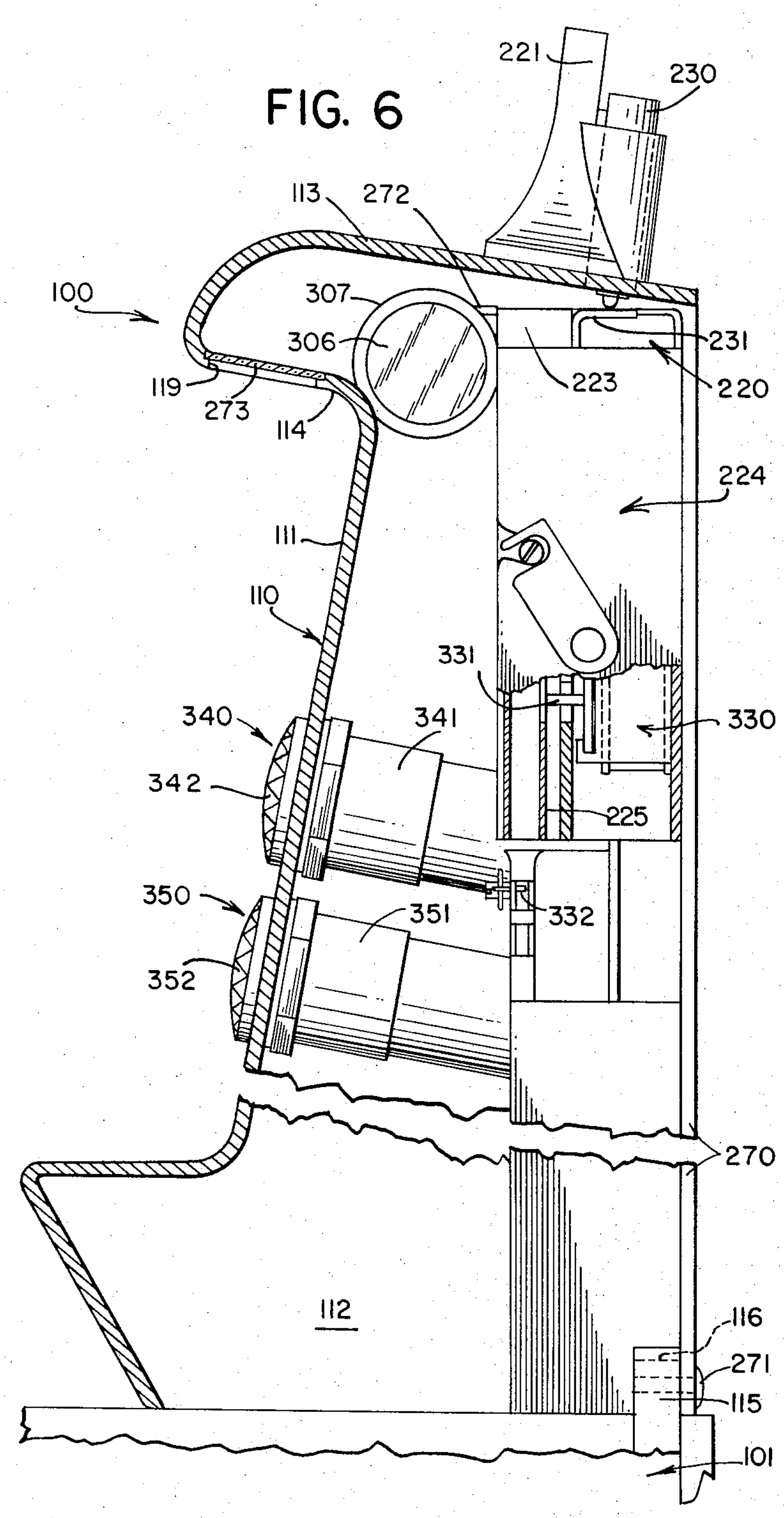
FIG. 6 is an enlarged fragmentary view in vertical section through the upper portion of the machine in FIG. 2 along the line 6—6 thereof.
Figure 16:
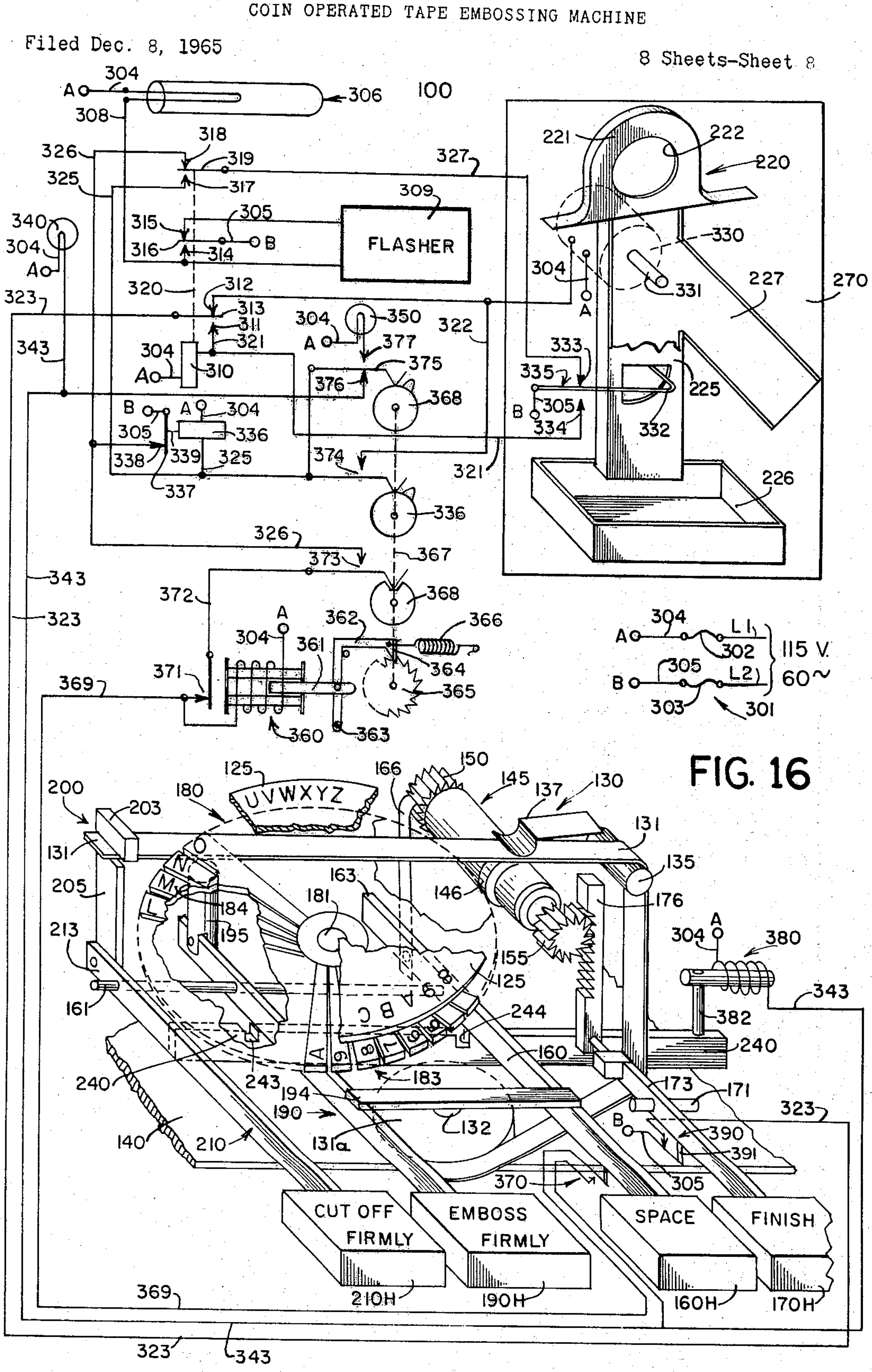
FIG. 16 is a schematic and diagrammatic representation of the control circuits for the embossing machine and the mechanical parts associated therewith.

In order to control the operation of the machine 100 to render it responsive to actuation by the insertion of coins in the coin handling mechanism 220, a control circuit 300 has been provided, see FIG. 16, most of the components of the control circuit 300 being disposed upon a mounting plate 270 generally rectangular in shape and closing the rear of the upper housing 110, see FIGS. 4 and 6 also. More specifically, the mounting plate 270 is held in position by a plurality of screws 271 that engage in the openings in the projections 116 disposed in the four rear corners of the upper housing 110. The control circuit 300 is adapted to be operated by energy derived from a 115 volt 60 cycle source 301 of electrical potential diagrammatically illustrated in FIG. 16 and comprising a pair of line conductors L1 and L2, the line conductors connecting to a pair of fuses 302 and 303, respectively, that in turn connect to main conductors 304 and 305, the fuses 302 and 303 being mounted on the plate 270, see FIG. 4. Forming a part of the control circuit 300 is an illuminating lamp 306 mounted in the upper portion of the upper housing 110, see FIGS. 4 and 6 also, and provided with a base 307 mounted on the plate 270 by means of a bracket 272. Light from the lamp 306 shines through an opening 119 provided in the lower wall 116, both the lamp 306 and the opening 119 being elongated, a window 273 formed of synthetic organic platic resin being provided in the opening 119. One terminal of the lamp 306 is connected to the main conductor 304 and the other terminal 304 is connected to a conductor 308 which also connects with a flashing mechanism 309, the mechanism 309 being adapted to interrupt the flow of current to the lamp 306, thereby to cause a flashing thereof.

There further is provided a first control relay 310 provided with a plurality of pairs of switch contacts and cooperating switch springs; more specifically, a first pair of switch contacts 311 and 312 is provided having a cooperating switch spring 313 that is normally disposed against the switch contact 312; a second pair of switch contacts 314 and 315 is provided having a cooperating switch spring 316 normally disposed against the switch contact 315; and a third pair of switch contacts 317 and 318 is provided having a cooperating switch spring 319 normally disposed against the switch contact 318. Further the control relay 310 has an armature 320 to which the several switch springs 313, 316 and 319 are connected in the usual manner for simultaneous movement upon the energization of the control relay 310. One terminal of the relay 310 is connected to the main conductor 304 and the other terminal is connected by a conductor 321 both to the switch contact 311 and to a coin or start switch 335 to be described more fully hereinafter. The switch contact 312 is connected to a conductor 322 while the cooperating switch spring 313 is connected to a conductor 323. The switch contact 314 is connected to the conductor 308 and therefore also to one of the terminals of the flashing mechanism 309; the switch contact 315 is connected by a conductor 324 to the other terminal of the flashing mechanism 309, while a cooperating switch spring 316 is connected to the main conductor 305. Finally, the switch contact 317 is connected to a conductor 325, the switch contact 318 is connected to a conductor 326 and the cooperating switch spring 319 is connected to a conductor 327.

There further is provided for the control circuit 300 and mounted upon the plate 270 a coin return solenoid 330, see FIG. 6 also, the solenoid 330 being provided with a plunger 331 which normally extends through an opening in the rear of the delivery chute 225 and is normally disposed in blocking relationship therewith to direct coins into the coin return chute 227; upon energization of the solenoid 330, the plunger 331 is withdrawn as illustrated in FIG. 6, thereby to permit coins to continue downwardly to the delivery chute 225. Also mounted upon the plate 210 adjacent to the delivery chute 225 is the coin or start switch 335, the switch 335 including a switch arm 332 extending into an opening in the front of the delivery chute 225 and disposed in the path of the coin falling therethrough, whereby a coin falling through the delivery chute 225 actuates the switch arm 332. The switch 335 further comprises a pair of switch contacts 333 and 334 that cooperate with the switch arm 332, a spring (not shown) normally urging the switch arm 332 against the switch contact 333 as illustrated in FIG. 16, whereby dropping of a coin through the chute 225 moves the switch arm 332 against the switch contact 334. One terminal of the coin return solenoid 330 is connected to the main conductor 304 and the other terminal thereof is connected to the conductor 322. The switch arm 332 is connected to the main conductor 305, the switch contact 333 is connected to the conductor 327 and the switch contact 334 is connected to the conducor 321. There further is provided a second control relay 336 mounted upon the plate 270 and having one terminal thereof connected to the main conductor 304 and the other terminal connected to the conductor 325, the relay 336 controlling contact between a switch spring 337 and a switch contact 338 by means of an armature 339 connected to the switch spring 337. The switch contact 338 is connected to the conductor 326 while the switch spring 337 is connected to the main conductor 305.

In order to assist the user in the operation of the machine 100, there is provided on the front wall 111 of the upper housing 110 an instruction panel 124 having associated therewith a first signal light 340 and a second signal light 350. Referring particularly to FIGS. 4, 6 and 16, it will be seen that the first signal light 340 includes a base 341 mounted upon the housing front wall 111 and a lens 342 disposed at the front thereof preferably having a predetermined color, such as green. One terminal of the signal light 340 is connected to the main conductor 304 and the other terminal thereof is connected to a conductor 343. The second signal light 350 also includes a base 351 mounted upon the housing front wall 111 and provided with a lens 352 that is also preferably of a distinctive color, such as red. One terminal of the signal light 350 is connected to the main conductor 304 and the other terminal thereof is connected to a switch contact on the counting relay 360 to be described hereinafter.

Also mounted upon the plate 270 is the counting relay 360, see FIGS. 4 and 16, the relay 360 including a movable armature 361 that is pivotally connected to a lever arm 362 pivoted at the lower end thereof as at 363 and carrying a finger or pawl 364 on the other end thereof. The finger 364 is adapted to engage between the teeth in an associated ratchet wheel 365, a spring 366 serving to hold and urge the finger 364 into driving relationship with the ratchet wheel 365. Connected to the ratchet wheel 365 is a shaft 367 carrying thereon three spaced apart cams 368. The relay 360 has one terminal thereof connected to the main conductor 304 and the other terminal connected by a conductor 369 to one terminal of a normally open emboss and space switch 370. Also associated with the relay 360 is an interruptor switch 361 which has one terminal connected to the conductor 369 and the other terminal connected to a conductor 372. The lowermost one of the cams 368 as viewed in FIG. 16 controls a normally open switch 373, the middle cam 368 controls a normally open switch 374 while the third or uppermost cam 368 controls a switch spring 375 which is movable between a pair of switch contacts 376 and 377, the switch spring normally being against the switch contact 376. The switch 373 has one terminal connected to the conductor 372 and the other terminal connected to the conductor 326; the switch 374 has one terminal connected to the conductor 325 and the other connected to the conductor 322; while the switch spring 375 is connected to the conductor 325, the switch contact 376 is connected to the conductor 343 and the switch contact 377 is connected to one of the terminals of the signal light 350.

Referring now particularly to FIGS. 5, 11 and 16 of the drawings, further details of the construction and arrangement of the emboss and space switch 370 will be described. The switch 370 is more specifically mounted upon the mounting plate 140, see FIG. 11, and has an actuating arm 378 that is in position to be contacted by the space lever 160, whereby for each operation of the space lever 160, the emboss and space switch 370 is operated from the normal open position thereof to the closed position thereof. Since the emboss lever 190 is mechanically interconnected by the bar 194 to the lever 160, each operation of the emboss lever 190 also serves to actuate the switch 370 from the normal open position thereof to the closed position thereof. From FIG. 16 it will be seen that the switch 370 has one terminal thereof connected to the conductor 343 and the other terminal thereof connected to the conductor 369.

A lock solenoid 380 is mounted below the plate 140, see FIGS. 8 and 12, the lock solenoid 380 including an armature 381 to which is connected an upstanding arm 382 that extends upwardly through a slot in the plate 140 and engages in a complementarily shaped opening in the lock bar 240, see FIGS. 13 to 15. A spring 383 normally under tension is connected between the armature 381 and a post 384 extending downwardly from the plate 140, thereby to urge the armature 381 and the connected lock bar 240 to the right as viewed in FIGS. 8 and 13 to 16, i.e., to the locking position illustrated in FIG. 13. Referring to FIG. 16, it will be seen that one terminal of the solenoid 380 is connected to the main conductor 304 and the other terminal thereof is connected to the conductor 343.

Figure 7:
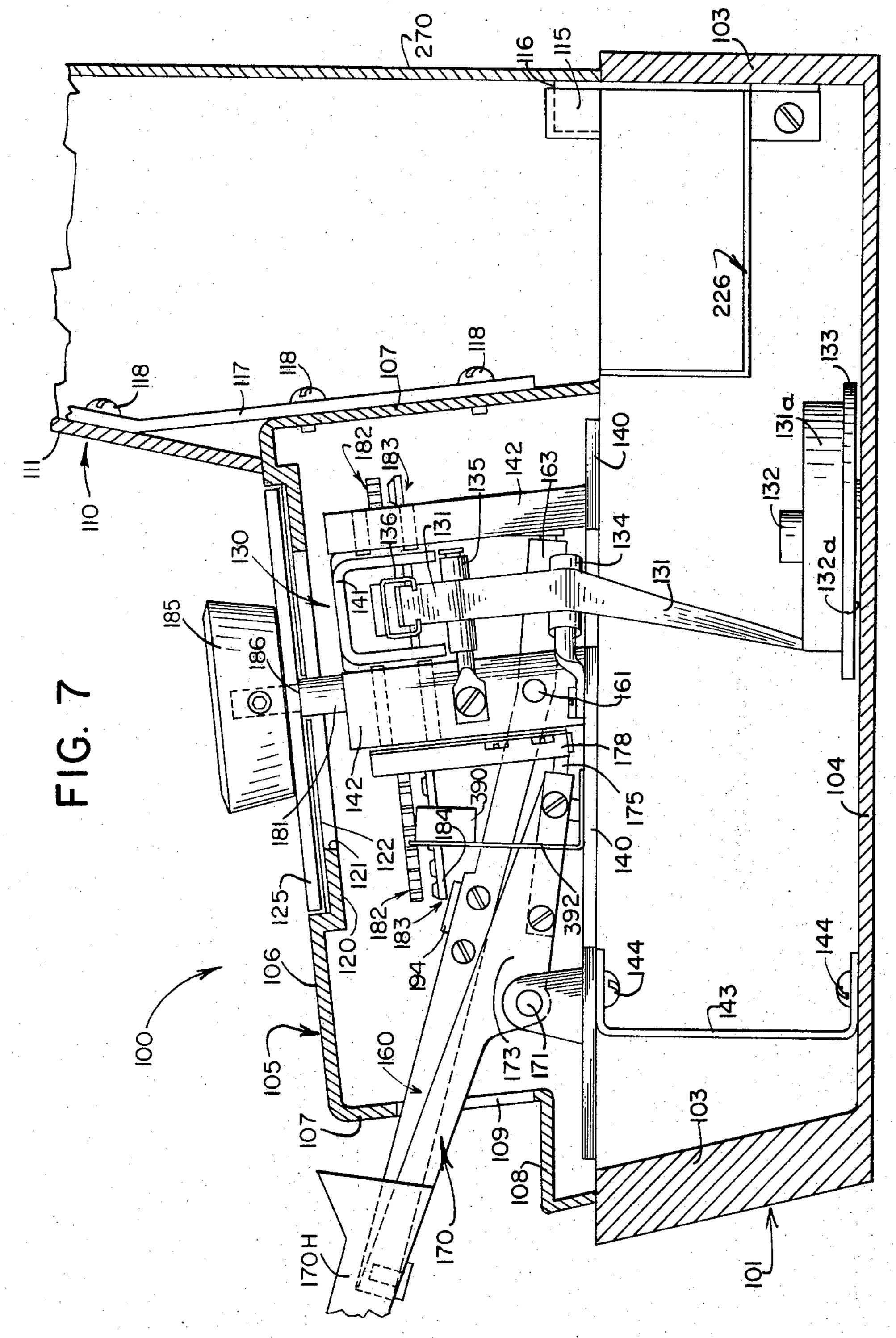
FIG. 7 is an enlarged view in vertical section through the machine of FIG. 2 along the line 7—7 thereof.

Mounted adjacent to the finish lever 170 is a finish switch 390, the finish switch 390 being more particularly supported by a bracket 392 mounted on the plate 140 and extending upwardly therefrom, see FIGS. 5, 7 and 16 of the drawings. Forming a part of the finish switch 390 is a plunger 391 operated by an actuating arm 393 adapted to be contacted by the arm 173 on the lever 170 when the lever 170 is in the fully depressed position thereof. Referring to FIG. 16, it will be seen that the switch 390 is normally closed and is opened by depressing the finish lever 170, one terminal of the switch 390 being connected to the main conductor 305 and the other terminal thereof being connected to the conductor 343.

The sequence of operation of the machine 100 will now be described in detail with special reference to FIG. 16 of the drawings. When the machine 100 is not connected to the electrical source 301, or if one of the fuses 302 or 303 is open, the illuminating lamp 306 is unlighted and all of the parts are in the position illustrated in FIG. 16 and particularly the plunger 331 on the coin return solenoid 330 is in a position to block the coin chute 225, whereby if a potential user places a coin in the inlet 221, the coin will be returned to the user via the coin return chute 227 and specifically to the receptacle 228 (see FIGS. 1 and 4 also). The lock solenoid 380 is also de-energized and accordingly, the spring 383 urges the lock bar 240 to the locking position thereof illustrated in FIG. 13, whereby operation of the space lever 160, the finish lever 170 and the emboss lever 190 is blocked, the only lever that is operative being the cut-off lever 210.

If the machine 100 is now connected to the source 301 and both of the fuses 302 and 303 are operative, the illuminating lamp 306 is energized, and more specifically, is energized through the flasher 309, thereby to give a flashing light signal indicating that the machine is ready for use. The circuit for the lamp 306 can be traced from the main conductor 304 through the lamp 306, the conductor 308, the flashing mechanism 309, the switch contact 315 and the switch spring 316 to the other main conductor 305. The coin return solenoid 330 is also energized, thereby to withdraw the plunger 331 from the coin delivery chute 225, thus permitting coins to fall through the chute 225 to operate the coin switch 335. A circuit for the coin return solenoid 330 can be traced from the main conductor 304 through the coil of the solenoid 330, the conductor 322, the normally closed contact between the switch contact 312 and the switch spring 313, the conductor 323, and the normally closed finish switch 390 to the other main conductor 305.

In order to use the machine 100, a potential user first deposits a coin of the required denomination in the coin inlet 221. If the coin is a genuine coin of the proper denomination, it passes through the coin rejector mechanism 224, past the coin return solenoid plunger 331 and enters the delivery chute 225. In falling through the delivery chute 225, the coin operates the start switch 335, and thereafter is deposited in the coin receptacle 226. In the operation of the start switch 335, the switch arm 332 is moved from the normal upper position illustrated in FIG. 16 to the lower position wherein it is against the switch contact 334. Such movement of the switch arm 332 completes a circuit for the first control relay 310 to energize the relay, the circuit being traced from the main conductor 304 through the coil of the relay 310, the conductor 321, the switch contact 334 and the switch arm 332 to the other main conductor 305. The relay 310 is immediately energized and the armature 320 thereof moves downwardly to move all of the switch springs 313, 316 and 319 from the upper positions thereof to the lower positions thereof. Particularly, the switch spring 317 is moved against the switch contact 311 to establish a holding circuit for the relay 310, which holding circuit can be traced from the main conductor 304 through the coil of the relay 310, the conductor 321, the switch contact 311, the switch spring 313, the conductor 323 and the normally closed finish switch 390 to the other main conductor 305. As a consequence, the immediate return of the switch arm 332 to the normal or upper position thereof does not interrupt operation of the control relay 310, the control relay 310 continuing to be energized by the holding circuit thus described.

The machine 100 and the control circuit 300 therefor is now in the ready condition, i.e., the user can begin to emboss the plastic tape 131. Two signals are provided to the user to indicate that he may begin the embossing operation. The first signal is provided by the illuminating lamp 306 which is changed from a flashing operation to a steady illumination operation by energization of the relay 310. More specifically, operation of the relay 310 moves the switch spring 316 from its upper position to its lower position against the switch contact 314, whereby the circuit for the illuminating lamp 306 can be traced from the main conductor 304 through the lamp 306, the conductor 308, the switch contact 314 and the switch spring 316 to the other main conductor 305, thereby eliminating the flashing mechanism 309 from the circuit for the illuminating lamp 306. A second signal is given to the user by the green signal light 340, a circuit therefor being established from the main conductor 304 through the light 340, the conductor 343, the normally closed switch contacts 375–376, the conductor 325, the contact 317, the switch spring 319 (moved against the switch contact 317 by operation of the control relay 310), the conductor 327, the switch contact 333, and the switch arm 332 to the other main conductor 305.

Operation of the control relay 310 also serves to deenergize the coin return solenoid 330 by interrupting the connection between the switch contact 312 and the switch spring 313, whereby no power is supplied to the coil of the solenoid 330. As a consequence, the plunger 331 moves outwardly into the coin chute 225, thereby to divert any additional coins to the return chute 227. The second control relay 336 is also energized by the operation of the first control relay 310, the circuit therefor being traced from the main conductor 304 through the coil of the solenoid 336, the conductor 325, the now closed upper switch pair including the switch contact 317 and the switch spring 319, the conductor 327, the switch contact 333 and the switch arm 332 to the other main conductor 305. Operation of the relay 326 serves to open the switch associated therewith, more specifically, to move the switch spring 337 away from the switch contact 338. Finally, the lock solenoid 380 is energized to move the lock bar 240 from the locking position illustrated in FIG. 13 to the operating position illustrated in FIG. 14. The circuit for energizing the lock solenoid 380 is traced from the main conductor 304 through the coil of the solenoid 380, the conductor 343, the normally closed connection between the switch spring 375 and the switch contact 376, the conductor 325, the switch contact 333 and the switch arm 332 to the other main conductor 305.

Upon the movement of the lock bar 240 to the operating position thereof illustrated in FIG. 14, the space lever 160, the finish lever 170 and the emboss lever 190 are rendered free to operate, while the cut-off lever 210 is prevented from operation. The user can now press firmly downwardly on the emboss handle 190H and cause operation of the embossing mechanism 180, thereby to emboss a character on the tape 131. Such operation of the emboss lever 190 through the action of the bar 194 also serves to depress the space lever 160, thereby to cause operation of the feed mechanism 130 immediately after release of the emboss lever 190. Operation of the space lever 160 either through operation of the emboss lever 190 or through independent operation thereof serves, in addition to operating the feed mechanism 130, to close the emboss and space switch 370 associated therewith. Closure of the switch 370 serves to energize the counting relay 360, a circuit being established from the main conductor 304 through the coil of the counting relay 360, the conductor 369, the now closed switch 370, the conductor 343, the switch contact 376, the switch spring 375, the conductor 325, the switch contact 317, the switch spring 319, the conductor 327, the switch contact 333 and the switch arm 332 to the other main conductor 305. Energization of the counting relay 360 serves to move the ratchet wheel 365 in a clockwise direction as viewed in FIG. 16 one step and likewise to move the connected cams 368, the lowermost cam 368 closing the switch 373 upon the first closure of the switch 370.

After a predetermined number of closures of the switch 370 corresponding to a predetermined number of depressings of the emboss handle 190H and the space handle 160H, for example, after 19 closures of the switch 370 if there are 20 teeth on the ratchet wheel 365, the counting relay 360 through a corresponding 19 operations moves the cams 368 to a position such that the normally open switches controlled thereby are closed and the normally closed switches controlled thereby are opened. More specifically, the switch 373 is closed, the switch 374 is closed, and the switch spring 375 is moved out of engagement with the switch contact 376 and into engagement with the switch contact 377. The green signal light 340 is de-energized since the circuit therefor was through the normally closed switch set 375–376; the red signal light 350 is energized, the circuit therefor being traced from the main conductor 304 through the light 350, the switch contact 377, the switch arm 375, the conductor 325, the switch contact 317, the switch arm 319, the conductor 327, the switch contact 333 and the switch arm 332 to the main conductor 305. Extinguishing of the green light 340 and energization of the red light 350 signals the user that he has exhausted the number of embossing and spacing operations purchased by his first coin, whereby he may now terminate or finish the operation or he may insert a second coin and continue operation. To this end the coin return solenoid 330 is also energized to withdraw the plunger 331, the circuit for the solenoid 330 being traced from the main conductor 304 through the winding of the solenoid 330, the conductor 322, the now closed switch 374, the conductor 325, the switch contact 317, the switch spring 319, the conductor 327, the switch contact 333 and the switch arm 332 to the other main conductor 305, whereby another coin may be now inserted again to operate the coin switch 335.

Should a customer deposit a second coin, thus to operate again the coin switch 335, the circuit energizing the second control relay 336 is momentarily interrupted since the circuit therefor is through the switch contact 333 and the switch arm 332, whereby momentarily to close the switch associated with the second relay 336, namely, to place the switch spring 337 against the switch contact 338. This establishes a circuit for once more energizing the counting relay 360 through a circuit traced from the main conductor 304 through the coil of the relay 360, the conductor 369, the interruptor switch 371 associated therewith, the conductor 370, the now closed switch 373, the conductor 326, the switch contact 338 and the switch spring 337 to the other main conductor 305. Such energization of the counting relay 360 causes operation thereof to move the ratchet wheel 365 one step which moves the cams 368 out of engagement with the associated switch springs, thereby to return the normally closed switches controlled thereby to the closed position thereof and to move the normally open switches thereby to the normally open position thereof. Upon the return of the switch arm 332 to the upper position thereof, the second control relay 336 is again energized to open the switch associated therewith, thus to return all of the parts to the ready condition described above. More particularly, the red signal light 350 has now been extinguished and the green signal light 340 energized. The coin return relay 330 has been de-energized to extend the plunger 331 and the first control relay 310 is in the energized position thereof. The user can now again operate the machine 100 for 19 operations of the switch 370, i.e., a total of 19 operations of the emboss lever 190 and/or the space lever 160.

When the user has used 19 embossing operations, whereby to cause the counting relay 360 to operate the cams 368 into the actuating positions thereof, i.e., the normally closed switches controlled thereby are opened and the normally open switches controlled thereby are closed, the user instead of choosing to continue the embossing operation may decide to execute a finish operation. More specifically, the user may depress the finish handle 170H, thereby to operate the finish lever 170. Operation of the finish lever 170 first of all causes a predetermined length of feed of the strip 131 by the feed mechanism 130, five spaces being a typical feed during the finish operation. At the termination of the finish operation, the finish switch 390 is operated from a normally closed position to an open position, which operation de-energizes the control relay 310, restores the illuminating lamp 306 to the flashing condition thereof, energizes the coin return solenoid 330, de-energizes the control relay 336 and causes one more operation of the counting relay 360 to return the parts to the power-on condition. More specifically, opening of the finish switch 390 at the termination of the finish operation de-energizes the control relay 310 since the holding circuit therefor is through the switch 390; de-energization of the relay 310 moves the armature 320 and the associated switch springs to the normal or up position illustrated in FIG. 16 of the drawings. Accordingly, the circuit for the illuminating lamp 306 is now from the main conductor 304 through the lamp 306, the conductor 308, the flashing mechanism 309, the conductor 324, the switch contact 315 and the switch spring 316 to the other main conductor 305, whereby to provide for flashing operation of the illuminating lamp 306. The coin return solenoid 330 is once against energized by the circuit that can be traced from the main conductor 304 through the coil of the solenoid 330, the conductor 322, the switch contact 312, the switch spring 313, the conductor 323 and the now closed finish switch 390 to the other main conductor 305. The control relay 336, however, is de-energized since the circuit therefor includes the now open contact between the switch contact 317 and the switch spring 319; the green signal light 340 is likewise de-energized since it also normally utilizes this now open switch. The counting relay 360, however, is advanced one step by the operation of a circuit that can be traced from the main conductor 304 through the coil of the counting relay 360, the now closed switch 371, the conductor 372, the now closed switch 373, the conductor 326, the now closed switch including the switch spring 337 and the switch contact 338 to the other main conductor 305; this additional operation of the counting relay 360 moves the cams 368 to the non-actuating position illustrated in FIG. 16. All of the parts of the control apparatus 300 are now in position to begin a new cycle of operation upon the insertion of a coin of the proper character and denomination in the coin handling mechanism 220.

As soon as the counting relay 360 reaches the 19th position or step thereof corresponding to the 19th actuation of the switch 370 as described above, the lock solenoid 380 is de-energized due to the fact that the normally closed switch comprising the switch spring 375 and the switch contact 376 has been opened, thus interrupting the flow of current therethrough. As a result, the spring 383, see FIG. 8, attempts to return the lock bar 240 from the operating position thereof illustrated in FIG. 14 to the locking position thereof illustrated in FIG. 13; however, the nose 263 on the pawl 260 which has been disposed in a righthand portion of the notch 245 is urged into the notch 245 by the action of the spring 262, whereby to place the abutment surface 264 on the pawl 260 in engagement with the abutment surface 246 on the lock bar 240, thus to place the parts in the finish position illustrated in FIG. 15. If the user at this time executes a finish operation and depresses the finish lever 170, the arm 250 on the finish lever 170 pushes the slide 252 forwardly or upwardly as illustrated in FIG. 15 from the solid line position thereof to the dashed line position thereof; the nose 256 on the slide 252 contacts the lock pawl 260 and rotates it against the action of the spring 262 from the solid line position to the dashed line position of FIG. 15. This action releases the lock bar 240 permitting the spring 283, FIG. 8, to move the lock bar 240 from the finish position to FIG. 15 to the locking position of FIG. 13, it being understood that the slide 252 is automatically withdrawn or moved downwardly when the finish lever 170 is released. When in the finish position, it will again be noted that the space lever 160, the emboss lever 190 and the cut-off lever 210 are all locked in an inoperative position by the lock bar 240. At the conclusion of the finish operation at which time the parts are returned to the locking position illustrated in FIG. 13, the space lever 160, the finish lever 170 and the emboss lever 190 are all locked, whereas the cut-off lever 210 is now free to be operated by the user so that he can cut from the strip of the tape 131 the embossed portion that he has made. Operation of the finish mechanism to begin added operation of the feed mechanism 130 is important to insure that an adequate margin is provided on the cut-off portion of the tape that is delivered to the user, and to insure that the next user will not have a section of embossed tape in the machine when he begins operation thereof.

It may be that the user does not desire to utilize the full 19 embossing and spacing operations, whereby an early finish operation is desired, after, for example, 15 operations of the embossing and/or spacing mechanisms. At this time the counting relay 360 will not have moved the cams 368 to the actuating positions thereof, whereby the switch 373 is closed, the switch 374 is open and the switch spring 375 is against the switch contact 376. If the customer now executes the finish operation by depressing the finish lever 170, first of all the feed mechanism 130 is operated to cause a predetermined length of feed of the strip 131, five spaces being typical. At the termination of the finish operation, the finish switch 390 is operated from the normally closed position to the open position, which operation de-energizes the control relay 310; de-energization of the control relay 310 restores the illuminating lamp 306 to the flashing condition thereof, energizes the coin return solenoid 330, de-energizes the control relay 336 and causes repeated operation of the counting relay 360 to return the parts to the home or power-on condition. More specifically, opening of the finish switch 390 and the termination of the finish operation de-energizes the control relay 310 since the holding circuit therefor is through the switch 390; de-energization of the relay 310 moves the armature 320 and the associated switch springs to the normal or up position illustrated in FIG. 16 of the drawings. Accordingly, the circuit for the illuminating lamp 306 is now from the main conductor 304 through the lamp 306, the conductor 308, the flashing mechanism 309, the conductor 324, the switch contact 315 and the switch spring 316 to the other main conductor 305, thereby to provide for flashing operation of the illuminating lamp 306.

The coin return solenoid 330 is once again energized by the circuit that can be traced from the main conductor 304 through the coil of the solenoid 330, the conductor 332, the switch contact 312, the switch spring 313, the conductor 323, and the now closed finish switch 390 to the other main conductor 305. The control relay 336, however, is de-energized since the circuit therefor includes the now opened connection between the switch contach 317 and the switch spring 319; the green signal light 340 is likewise de-energized since it also normally utilizes this now opened connection.

The counting relay 360, however, is alternately energized and de-energized until it has been moved to the home or power-on position illustrated in FIG. 16. With both the control relays 310 and 336 de-energized, operating power is supplied to the counting relay 360 by a circuit that can be traced from the main conductor 304 through the coil of the counting relay 360, the now closed interruptor switch 371, the conductor 372, the now closed switch 373, the conductor 326, the contact 338 and the switch spring 337 to the other main conductor 305. Upon energization of the counting relay 360, the armature 361 thereof is actuated to move the lever arm 362 to the next position on the ratchet wheel 365 and the switch 371 is opened to de-energize the relay 360. As a consequence, the spring 366 will advance the ratchet wheel 365 one step clockwise carrying the cams 368 therewith. Upon de-energization of the counting relay 360, the switch 371 will again close, thereby again to establish the circuit described immediately above again energizing the counting relay 360. In other words, the interruptor switch 371 is alternately closed and opened accompanied by alternate energization and de-energization of the counting relay 360, each cycle of energization and de-energization advancing the ratchet wheel one step and likewise advancing the cams 368 one step. As soon as the ratchet wheel 365 and the cams 368 reach the home or power-on position illustrated in FIG. 16, the switch 373 is opened, thereby to break the circuit that has heretofore been supplying the energy for the stepwise operation of the counting relay 360. As a result, all of the parts of the control apparatus 300 are now in a position to begin a new cycle of operation upon the insertion of a coin of the proper character and denomination into the coin handling mechanism 220.

As soon as the finish lever 170 is actuated fully to open the finish switch 390, the control relay 310 is de-energized as explained above. De-energization of the control relay 310 opens the switch provided by the switch contact 317 and the switch spring 319, thereby to interrupt the flow of current through the lock solenoid 380. As a result, the spring 383, see FIG. 8, returns the lock bar 240 from the operating position thereof illustrated in FIG. 14 to the locking position illustrated in FIG. 13; this direct return of the lock bar 240 to the locking position is made possible by the fact that the finish lever 170 is still depressed, whereby the slide 252 is in the forward or dashed line position of FIG. 15, whereby there is nothing to interfere with the return of the lock bar 240 to the full locking position of FIG. 13. The slide 252 is automatically withdrawn or moved downwardly when the finish lever 170 is released. At the conclusion of the early finish operation, at which time the parts are returned to the locking position illustrated in FIG. 13, the space lever 160, the finish lever 170 and the emboss lever 190 are all locked, whereas the cut-off lever 210 is now free to be operated by the user so that he can cut from the strip of the tape 131 the embossed portion that he has made. The machine 100 is now in the power-on condition and is ready to be used again upon the insertion of a coin of the proper character and denomination into the coin handling mechanism 220.

From the above it will be seen that there has been provided a coin operated plastic tape embossing machine which fulfills all of the objects and advantages set forth above. More specifically, by means of the lock bar 240 and the interconnection thereof with the control circuit 300, operation of all of the four levers of machine 100 are coin controlled automatically in the proper sequence and relationship one to the other. More specifically, the feed lever 160 and the emboss lever 190 are interconnected to cause the plastic tape 131 to be fed a predetermined distance after the embossing of a character thereon by the embossing mechanism 180, the bar 194 providing the necessary interconnection. The cut-off mechanism 200 is arranged to cut off the embossed section of the tape for the user after it has been fed past the embossing mechanism 180. By the provision of the counting relay 360, a predetermined number of actuations of the feed mechanism 130 serves to place the lock bar 240 in the locking position thereof until another coin is placed in the machine, the structure being particularly simple since but a single control switch operated by the space lever 160 serves to record both the formation of characters in the tape 131 and the provision of spaces therebetween.

An important feature of the invention resides in the provision of the finish mechanism which operates the feeding mechanism 130 to pass a predetermined length of the plastic tape past the embossing mechanism 180 at the end of an embossing operation, thereby to provide a suitable margin on each end of the embossed length of the plastic tape and to insure that the next user will not find a section of embossed tape in the machine; the operation of the finish mechanism is interconnected with the operation of the cut-off lower mechanism to insure that the finish mechanism is operated before the operation of the cut-off mechanism 200.

The machine 100 further provides signal lights to indicate the condition of operation of the machine so that the user will know when each of the various mechanisms thereof can be successfully operated, the signal lights being connected in the control circuit 300 so that they are operated automatically.

Finally, a coin rejecting apparatus has been utilized in the machine in addition to the normal coin rejection mechanism so that coins can be fed thereto only when the machine is in proper condition to receive additional coins.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A coin operated plastic tape embossing machine comprising mechanism for embossing characters on an embossable plastic tape, mechanism for feeding an elongated strip of the plastic tape from a supply thereof past said embossing mechanism, manually operated lever arms for operating said embossing and feeding mechanisms, lock structure having a locking condition and an operating condition, said lock structure in the locking condition thereof rendering said embossing mechanism inoperative and in the operating condition thereof rendering both of said mechanisms operative, and a coin operated control apparatus responsive to the supply of predetermined coins thereto for placing said lock structure in the operating condition thereof, thereby to render both said mechanisms operative to emboss and to feed plastic tape upon actuation of said lever arms.

2. The coin operated plastic tape embossing machine set forth in claim 1, wherein said lock structure in the locking condition thereof also renders said feeding mechanism inoperative.

3. The coin operated plastic tape embossing machine set forth in claim 1, and further comprising a cut-off mechanism for cutting an embossed section of the plastic tape from the elongated strip thereof after having been fed past said embossing mechanism.

4. A coin operated plastic tape embossing machine comprising mechanism for embossing characters on an embossable plastic tape, mechanism for feeding an elongated strip of the plastic tape from a supply thereof past said embossing mechanism, a first manually operated lever arm for operating said embossing mechanisms to emboss characters on the plastic tape, a second manually operated lever arm for operating said feeding mechanism stepwise to produce spaces between characters embossed on the plastic tape, a bar interconnecting said first and second lever arms for causing operation of said second lever arm for each operation of said first lever arm, lock structure having a locking condition and an operating condition, said lock structure in the locking condition thereof rendering at least one of said mechanisms inoperative and in the operating condition thereof rendering both of said mechanisms operative, and a coin operated control apparatus responsive to the supplying of predetermined coins thereto for placing said lock structure in the operating condition thereof, thereby to render both said mechanisms operative upon the actuation of the associated lever arm.

5. The coin operated plastic tape embossing machine set forth in claim 4, wherein said lock structure in the locking condition thereof locks both said first and second lever arms in an inoperative position thereof.

6. The coin operated plastic tape embossing machine set forth in claim 4, and further comprising a cut-off mechanism for cutting the embossed portion of the plastic tape from the elongated strip thereof, and a third manually operated lever arm for operating said cut-off mechanism.

7. A coin operated plastic tape embossing machine comprising mechanism for embossing characters on an embossable plastic tape, mechanism for feeding an elongated strip of the plastic tape from a supply thereof past said embossing mechanism, manually operated lever ams for operating said embossing and feeding mechanisms, lock structure having a locking condition and an operating condition, said lock structure in the locking condition thereof rendering at least one of said mechanisms inoperative and in the operating condition thereof rendering both of said mechanisms operative, a coin operated control apparatus responsive to the supplying of predetermined coins thereto for placing said lock structure in the operating condiiton thereof, and a counting apparatus responsive to a predetermined number of actuations of said mechanisms for placing said lock structure in the locking condition thereof, both of said control apparatus and said counting apparatus being electrically operated.

8. A coin operated plastic tape embossing machine comprising mechanism for embossing characters on an embossable plastic tape, mechanism for feeding an elongated strip of the plastic tape from a supply thereof past said embossing mechanism, a first manually operated lever arm for operating said embossing mechanism to emboss characters on the plastic tape, a second manually operated lever arm for operating said feeding mechanism stepwise to produce spaces between characters embossed on the plastic tape, a bar interconnecting said first and second lever ams for causing operation of said lever arm for each operation of said first lever arm, lock structure having a locking condition and an operating condition, said lock structure in the locking condition thereof rendering both of said lever arms inoperative and in the operating condition thereof rendering both of said lever arms operative, a coin operated control apparatus responsive to the supplying of predetermined coins thereto for placing said lock structure in the operating condition thereof, and a counting apparatus responsive to a predetermined number of actuations of said mechanisms for placing said lock structure in the locking condition thereof.

9. The coin operated plastic tape embossing machine set forth in claim 8, wherein said counting apparatus is responsive to actuation of said second manually operated lever arm.

10. A coin operated plastic tape embossing machine comprising mechanism for embossing characters on an embossable plastic tape, mechanism for feeding an elongated strip of the plastic tape from a supply thereof past said embossing mechanism, manually operated lever arms for operating said embossing and feeding mechanisms, lock structure having a locking condition and an operating condition, said lock structure in the locking condition thereof rendering at least one of said mechanisms inoperative and in the operating condition thereof rendering both of said mechanisms operative, a coin operated control apparatus including a coin actuated switch and a lock solenoid connected in circuit and being adapted to be connected to a source operating potential, and a counting apparatus including an actuating solenoid and a control switch therefor connected in said circuit and actuated in response to the operation of said mechanisms, said counting apparatus being operative in response to a predetermined number of actuations of said control switch therefor to place said lock structure in the locking condition thereof.

11. The coin operated plastic tape embossing machine of claim 10, wherein said counting apparatus control switch is mounted adjacent to and is actuated by the lever arm for said feeding mechanism.

12. A coin operated plastic tape embossing machine comprising mechanism for embossing characters on an embossable plastic tape, mechanism for feeding an elongated strip of the plastic tape from a supply thereof past said embossing mechanism, mechanism for finishing the embossing operation by feeding a predetermined length of the elongated strip of the plastic tape past said embossing mechanism, manually operated lever arms for operating said embossing mechanism and said feeding mechanism and said finish mechanism, lock structure having a locking condition and a finish condition and an operating condition, said lock structure in the locking condition thereof rendering at least one of said embossing and feeding mechanism inoperative and in the finish condition thereof rendering both said embossing and said feeding mechanisms inoperative and in the operating condition thereof rendering all of said mechanisms operative, a coin operated control apparatus responsive to the supplying of predetermined coins thereof for placing said lock structure in the operating condition thereof, a counting apparatus responsive to a predetermined number of actuations of said embossing and feeding mechanisms for placing said lock structure in the finish condition thereof, and apparatus responsive to the actuation of said finish mechanism for placing said lock structure in the locking condition thereof.

13. The coin operated plastic tape embossing machine set forth in claim 12, wherein all of said mechanisms are rendered inoperative when said lock structure is in the locking condition thereof.

14. The coin operated plastic tape embossing machine set forth in claim 12, wherein said finishing mechanism feeds a length of the plastic tape equivalent to about five characters upon actuation thereof.

15. The coin operated plastic tape embossing machine set forth in claim 12, wherein said counting apparatus is returned to the zero position thereof in response to actuation of said finish mechanism.

16. A coin operated plastic tape embossing machine comprising mechanism for embossing characters on an embossable plastic tape, mechanism for feeding an elongated strip of the plastic tape from a supply thereof past said embossing mechanism, mechanism for finishing an embossing operation by feeding a predetermined length of the elongated strip of the plastic tape past said embossing mechanism, a first manually operated lever arm for operating said embossing mechanism to emboss characters on the plastic tape, a second manually operated lever arm for operating said feeding mechanism stepwise to produce spaces between characters embossed on the plastic tape, a third manually operated lever arm for operating said finishing mechanism to feed a predetermined length of the plastic tape past said embossing mechanism, a bar interconnecting said first and second lever ams for causing operation of said second lever arm for each operation of said first lever arm, lock structure having a locking condition and a finish condition and an operating condition, said lock structure in the locking condition thereof preventing operation of all said lever arms and in the finish condition thereof preventing operation of said first and second lever arms and in the operative condition thereof permiting operation of all of said lever arms, a coin operated control apparatus responsive to the supplying of predetermined coins thereto for placing said lock structure in the operating condition thereof, a counting apparatus responsive to a predetermined number of actuations of said embossing and feeding mechanisms for placing said lock structure in the finish condition thereof, and apparatus responsive to the actuation of said finish mechanism for placing said lock structure in the locking condition thereof.

17. A coin operated plastic tape embossing machine comprising mechanism for embossing characters on an embossable plastic tape, mechanism for feeding an elongaetd strip of the plastic tape from a supply thereof past said embossing mechanism, mechanism for finishing an embossing operation by feeding a predetermined length of the elongated strip of the plastic tape past said embossing mechanism, mechanism for cutting off the embossed portion of the plastic tape beyond said embossing mechanism, manually operated lever arms for operating said embossing mechanism and said feeding mechanism and said finish mechanism and said cut-off mechanism, lock structure having a locking condition and a finish condition and an operating condition, said lock structure in the locking condition thereof rendering said embossing and feeding and finishing mechanism inoperative and in the finish condition thereof rendering said embossing and feeding and cut-off mechanisms inoperative and in the operating condition thereof rendering said cut-off mechanism inoperative and all the other of said mechanisms operative, a coin operated control apparatus responsive to the supplying of predetermined coins thereto for placing said lock structure in the operating condition thereof, a counting apparatus responsive to a predetermined number of actuations of said embossing and feeding mechanisms for placing said lock structure in the finish condition thereof, and apparatus responsive to the actuation of said finish mechanism for placing said lock structure in the locking condition thereof.

18. A coin operated plastic tape embossing machine comprising mechanism for embossing characters on an embossable plastic tape, mechanism for feeding an elongated strip of the plastic tape from a supply thereof past said embossing mechanism, mechanism for finishing an embossing operation by feeding a predetermined length of the elongated strip of the plastic tape past said embossing mechanism, mechanism for cutting off the embossed portion of the plastic tape beyond said embossing mechanism, a first manually operated lever arm for operating said embossing mechanism to emboss characters on the plastic tape, a second manually operated lever arm for operating said feeding mechanism to produce spaces between characters embossed on plastic tape, a third manually operated lever arm for operating said finishing mechanism to feed a predetermined length of plastic tape past said embossing mechanism, a fourth manually operated lever arm for operating said cut-off mechanism to cut off the embossed portion of the plastic tape, a bar interconnecting said first and second lever arms for causing operation of said second lever arm for each operation of said first lever arm, lock structure having a locking condition and a finish condition and an operating condition, said lock structure in the locking condition thereof rendering said embossing and feeding and finishing mechanism inoperative and in the finish condition thereof rendering said embossing and feeding and cut-off mechanism inoperative and in the operating condition thereof rendering said cut-off mechanism inoperative and all the other of said mechanism operative, a coin operated control apparatus responsive to the supplying of predetermined coins thereto for placing said lock structure in the operating condition thereof, a counting apparatus responsive to a predetermined number of actuations of said embossing and feeding mechanisms for placing said lock structure in the finish condition thereof, and apparatus responsive to the actuation of said finish mechanism for placing said lock structure in the locking condition thereof.

19. The coin operated plastic tape embossing machine set forth in claim 18, wherein said lock structure in the locking condition thereof locking said first second and third lever arms in an inoperative position thereof and in the finish condition thereof locking said first and second and fourth lever arms in an inoperative position thereof and in the operating condition thereof locking said fourth lever arm in an inoperative position thereof.

20. A coin operated plastic tape embossing machine comprising mechanism for embossing characters on an embossable plastic tape, mechanism for feeding an elongated strip of the plastic tape from a supply thereof past said embossing mechanism, manually operated lever arms for operating said embossing and feeding mechanisms, lock structure having a locking condition and an operating condition, said lock structure in the locking condition thereof rendering at least one of said mechanisms inoperative and in the operating condition thereof rendering both of said mechanisms operative, a coin operated control apparatus responsive to the supplying of predetermined coins thereof for placing said lock structure in the operating condition thereof, and a signal light connected to said control apparatus and operative to provide first and second signals, said signal light providing said first signal when said lock structure is in the locking condition thereof and providing said second signal when said lock structure is in the operating condition thereof.

21. The coin operated plastic tape embossing machine set forth in claim 20, wherein said signal light is an illuminating lamp and said first signal is a flashing illumination from said lamp and said second signal is a continuous illumination from said lamp.

22. The coin operated plastic tape embossing machine set forth in claim 20, wherein said first signal corresponds to lack of operation of said light and said second signal corresponds to operation of said light.

23. A coin operated plastic tape embossing machine comprising mechanism for embossing characters on an embossable plastic tape, mechanism for feeding an elongated strip of the plastic tape from a supply thereof past said embossing mechanism, mechanism for finishing an embossing operation by feeding a predetermined length of the elongated strip of the plastic tape past said embossing mechanism, manually operated lever arms for operating said embossing mechanism and said feeding mechanism and said finish mechanism, lock structure having a locking condition and a finish condition and an operating condition, said lock structure in the locking condition thereof rendering at least one of said embossing and feeding mechanisms inoperative and in the finish condition thereof rendering both said embossing and said feeding mechanisms inoperative and in the operating condition thereof rendering all of said mechanisms operative, a coin operated control apparatus responsive to the supplying of predetermined coins thereto for placing said lock structure in the operating condition thereof, first and second signal lights connected to said control apparatus, a counting apparatus responsive to a predetermined number of actuations of said embossing and feeding mechanisms for placing said lock structure in the finish condition thereof, and apparatus responsive to the actuation of said finish mechanism for placing said lock structure in the locking condition thereof, said first signal light being energized when said lock structure is in the operating condition thereof and said second signal light being energized when said lock structure is in a finish condition thereof and neither of said signal lights being energized when said lock structure is in the locking condition thereof.

24. A coin operated plastic tape embossing machine comprising mechanism for embossing characters on an embossable plastic tape, mechanism for feeding an elongated strip of the plastic tape from a supply thereof past said embossing mechanism, manually operated lever arms for operating said embossing and feeding mechanisms, lock structure having a locking condition and an operating condition, said lock structure in the locking condition thereof rendering at least one of said mechanisms inoperative and in the operating condition thereof rendering both of said mechanisms operative, a coin operated control apparatus responsive to the supplying of predetermined coins thereto for placing said lock structure in the operating condition thereof, coin rejecting apparatus responsive to the placement of said lock structure in the operating condition thereof for rejecting coins from said machine until said lock structure is in the locking condition thereof and a signal light connected to said control apparatus and operative to provide a first signal in response to the placing of said lock structure in the operating condition thereof and operative to produce a second signal in response to the placing of said lock structure in the locking condition thereof.

25. A coin operated plastic tape embossing machine comprising mechanism for embossing characters on an embossable plastic tape, mechanism for feeding an elongated strip of the plastic tape from a supply thereof past said embossing mechanism, mechanism for finishing an embossing operation by feeding a predetermined length of the elongated strip of the plastic tape past said embossing mechanism, manually operated lever arms for operating said embossing mechanism and said feeding mechanism and said finish mechanism, lock structure having a locking condition and a finish condition and an operating condition, said lock structure in the locking condition thereof rendering at least one of said embossing and feeding mechanisms inoperative and in the finish condition thereof rendering both said embossing and said feeding mechanisms inoperative and in the operating condition thereof rendering all of said mechanisms operative, a coin operated control apparatus responsive to the supplying of predetermined coins thereto for placing said lock structure in the operating condition thereof, a counting apparatus responsive to a predetermined number of actuations of said embossing and feeding mechanisms for placing said lock structure in the finish condition thereof, apparatus responsive to the actuation of said finish mechanism for placing said lock structure in the locking condition thereof, and coin rejecting apparatus responsive to the placement of said lock structure in the operating condition thereof for rejecting coins from said machine until said lock structure is in the locking or finish condition thereof.

26. The coin operated plastic tape embossing machine set forth in claim 25, and further comprising a first signal light operative in response to the placement of said lock structure in the operating condition thereof, and a second signal light operative in response to the placement of said lock structure in the finish condition thereof, both of said signal lights being inoperative when said lock structure is in the locking condition thereof.

27. A coin operated plastic tape embossing machine comprising mechanism for embossing characters on an embossable plastic tape, mechanism for feeding an elongated strip of the plastic tape from a supply thereof past said embossing mechanism, manually operated lever arms for operating said embossing and feeding mechanisms, a lock bar mounted adjacent to said lever arms and shiftable between a locking position and an operating position and a finish position intermediate said locking position and said operating position, said lock bar having slots in an edge thereof for registering with said lever arms when said lock bar is in the operating position thereof and being out of line with at least one of said lever arms when in the locking position thereof to prevent movement of said one lever arm, a coin operated control apparatus responsive to the supplying of predetermined coins thereto for placing said lock bar in the operating position thereof and for holding said lock bar in the operating position thereof, thereby to render both said mechanism operative to emboss and to feed plastic tape upon actuation of said lever arms, means for biasing said lock bar away from the operating position thereof, means responsive to a predetermined maximum number of actuations of said mechanisms for moving said lock bar to the finish position thereof, and manual means for returning said lock bar to the locking position thereof after a predetermined number of actuations of said mechanisms less than said maximum number.

28. A coin operated plastic tape embossing machine comprising mechanism for embossing characters on an embossable plastic tape, mechanism for feeding an elongated strip of the plastic tape from a supply thereof past said embossing mechanism, manually operated lever arms for operating said embossing and feeding mechanisms, lock structure having a locking condition and an operative condition, said lock structure in the locking condition thereof locking at least one of said arms in an inoperative position to render the associated mechanism inoperative and in the operating condition thereof rendering both of said mechanisms operative, and a coin operated control apparatus responsive to the supplying of predetermined coins thereto for placing said lock structure in the operating condition thereof, thereby to render both said mechanisms operative to emboss and to feed plastic tape upon actuation of said lever arms.

29. A coin operated plastic tape embossing machine comprising mechanism for embossing characters on an embossable plastic tape, mechanism for feeding an elongated strip of the plastic tape from a supply thereof past said embossing mechanism, manually operated lever arms for operating said embossing and feeding mechanisms, lock structure having a locking condition and an operating condition, said lock structure in the locking condition thereof rendering at least one of said mechanisms inoperative and in the operating condition thereof rendering both of said mechanisms operative, and a coin operated control apparatus for said lock structure, said control apparatus being electrically operated and including a solenoid for moving said lock structure between the locking condition and the operating condition thereof.

30. A coin operated plastic tape embossing machine comprising mechanism for embossing characters on an embossable plastic tape, mechanism for feeding an elongated strip of the plastic tape from a supply thereof past said embossing mechanism, manually operated lever arms for operating said embossing and feeding mechanisms, lock structure having a locking condition and an operating condition, said lock structure in the locking condition thereof rendering at least one of said mechanisms inoperative and in the operating condition thereof rendering both of said mechanism operative, a coin operated control apparatus responsive to the supplying of predetermined coins thereto for placing said lock structure in the operating condition thereof, thereby to render both said mechanisms operative to emboss and to feed plastic tape upon actuation of said lever arms, and structure responsive to operation of said embossing mechanism for causing operation of said feeding mechanism to cause the plastic tape to be fed to a predetermined distance after the embossing of a character thereon.

References Cited

UNITED STATES PATENTS

| | | | |
|---|---|---|---|
| 687,168 | 11/1901 | Roovers | 194—55 X |
| 739,865 | 9/1903 | Hartley | 194—9 |
| 1,702,811 | 2/1929 | Butler | 197—6.4 |

SAMUEL F. COLEMAN, *Primary Examiner.*

UNITED STATES PATENT OFFICE
CERTIFICATE OF CORRECTION

Patent No. 3,360,093 December 26, 1967

John V. McDonald et al.

It is hereby certified that error appears in the above numbered patent requiring correction and that the said Letters Patent should read as corrected below.

Column 1, lines 16 and 17, for "machanism" read -- mechanism --; line 62, for "in operative" read -- inoperative --; column 2, line 72, for "th" read -- the --; column 3, line 13, for "interconnecion" read -- interconnection --; column 4, line 39, for "change" read -- changed --; column 6, line 24, for "7," read -- 7 --; column 8, line 19, for "Pederson" read -- Pedersen --; column 10, line 36, for "platic" read -- plastic --; column 16, line 8, for "against" read -- again --; column 17, line 44, for "tach" read -- tact --; column 19, line 24, for "supply" read -- supplying --; line 43, for "mechanisms" read -- mechanism --; line 74, for "ams" read -- arms --; column 20, line 8, for "condiiton" read -- condition --; line 23, for "ams" read -- arms --; same line 23, before "lever", second occurrence, insert -- second --; column 21, line 2, for "mechanism" read -- mechanisms --; line 7, for "thereof" read -- thereto --; line 63, for "gaetd" read -- gated --; column 22, line 43, for "mechanism" read -- mechanisms --; line 72, for "thereof" read -- thereto --; column 24, lines 65 and 66, for "operative" read -- operating --; column 26, line 12, strike out "to", second occurrence.

Signed and sealed this 18th day of February 1969.

(SEAL)
Attest:

EDWARD M.FLETCHER,JR.
Attesting Officer

EDWARD J. BRENNER
Commissioner of Patents